(12) United States Patent
Centonza et al.

(10) Patent No.: US 8,488,586 B2
(45) Date of Patent: Jul. 16, 2013

(54) METHODS OF SELECTING TARGET CELLS USING NEIGHBOR CELL INFORMATION AND RELATED NETWORK CONTROLLERS

(71) Applicant: Telefonaktiebolaget L M Ericsson (publ), Stockholm (SE)

(72) Inventors: Angelo Centonza, Winchester (GB); Fredrik Gunnarsson, Linkoping (SE); Gino Luca Masini, Stockholm (SE); Gunnar Mildh, Sollentuna (SE); Oumer Teyeb, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/640,300

(22) PCT Filed: Oct. 5, 2012

(86) PCT No.: PCT/SE2012/051066
§ 371 (c)(1),
(2), (4) Date: Dec. 5, 2012

(65) Prior Publication Data

US 2013/0109380 A1 May 2, 2013

Related U.S. Application Data

(60) Provisional application No. 61/553,767, filed on Oct. 31, 2011, provisional application No. 61/554,248, filed on Nov. 1, 2011.

(51) Int. Cl.
*H04B 7/216* (2006.01)

(52) U.S. Cl.
USPC ............................ 370/350; 455/434; 375/150

(58) Field of Classification Search
USPC 370/350, 342, 331; 375/150, 145; 455/435.2, 455/557, 456, 434
See application file for complete search history.

(56) References Cited

U.S. PATENT DOCUMENTS

| | | | | |
|---|---|---|---|---|
| 2011/0013587 | A1* | 1/2011 | Serravalle | 370/331 |
| 2011/0212724 | A1* | 9/2011 | Wirtanen et al. | 455/435.2 |

OTHER PUBLICATIONS

3rd Generation Partnership Project; ETSI TS 125 331 v10.3.1 (May 2011) "Universal Mobile Telecommunications System (UMTS)"; Radio Resource Control (RRC); Protocol Specification; (3GPP TS 25.331 version 10.3.1 Release 10) http://www.etsi.org/deliver/etsi_ts/125300_125399/125331/10.03.0160/ts_125331v100301p.pdf, 1879 pages.
3rd Generation Partnership Project; ETSI TS 125 367 v10.0.0 (Mar. 2011) "Universal Mobile Telecommunications System (UMTS)"; Mobility procedures for Home Node B (HNB); Overall description; Stage 2 (3GPP TS 25.367 version 10.0.0 Release 10) 17 pages.

(Continued)

*Primary Examiner* — Phuoc Doan
(74) *Attorney, Agent, or Firm* — Myers Bigel Sibley & Sajovec, P.A.

(57) ABSTRACT

A method of operating a radio access network may include providing neighbor cell information identifying neighbor cells of a source cell and respective neighbor scrambling codes of the neighbor cells. A report may be received from a wireless terminal through the source cell with the report identifying a reported scrambling code of a reported cell and at least one detected scrambling code of at least one detected cell other than the reported cell. One of the neighbor cells may be selected as a target cell based on the reported scrambling code, the at least one detected scrambling code, and the neighbor cell information.

28 Claims, 13 Drawing Sheets

| Neighbor Relation | NCI | CSG ID | Cell Access Mode | Adjacent Cell PCSs | Adjacent Cell PCS Signal Strengths | Time Difference | No Remove | No HO |
|---|---|---|---|---|---|---|---|---|
| 1 | NCI #1 | CSG ID #1 | Closed | PCS = 1<br>PCS = 27<br>PCS = 85 | SS#1-1<br>SS#27-1<br>SS#85-1 | TD1 | | |
| 2 | NCI #2 | | | PCS = 1<br>PCS = 5<br>PCS = 85 | SS#1-2<br>SS#5-2<br>SS#85-2 | TD2 | | X |
| 3 | NCI #3 | | | PCS = 98<br>PCS = 213 | SS#98-3<br>SS#213-3 | TD3 | X | |
| 4 | NCI #4 | CSG ID #2 | Hybrid | PCS = 378<br>PCS = 456<br>PCS = 290<br>PCS = 68 | SS#378-4<br>SS#456-4<br>SS#290-4<br>SS#68-4 | TD4 | | |
| 5 | NCI #5 | | Open | PCS = 1 | SS#1-5 | TD5 | X | |
| * * * | | | | | | | | |

Enhanced Neighbor Relations Table

OTHER PUBLICATIONS

3rd Generation Partnership Project; 3GPP TSG-RAN3 Meeting #73, "Macro to small cell, metro cell Hand-in" R3-112026, Aug. 22-26, 2011, 8 pages; Alcatel-Lucent, AT&T; Athens, Greece.

3rd Generation Partnership Project; 3GPP TS 25.133 V10.4.0 (Dec. 2011) "Technical Specification Group Radio Access Network"; Requirements for support of radio resource management (FDD); (Release 10) http://www.quintillion.co.jp/3GPP/Specs/25133-a40.pdf; 268 pages.

3rd Generation Partnership Project; ETSI TS 125 484 V10.0.0 (Jul. 2011) "Universal Mobile Telecommunications System (UMTS)"; Automatic Neighbour Relation (ANR) for UTRAN; Stage 2 (3GPP TS 25.484 version 10.0.0 Release 10) 22 pages.

3rd Generation Partnership Project; "Legacy UE Macro to HNB Active Hand-in"; 3GPP TSG RAN WG3 Meeting #73bis, R3-112600, Oct. 10-14, 2011, Qualcomm Incorporated, AT&T, Alcatel-Lucent, IP.access; 4 pages.

3rd Generation Partnership Project; ETSI TS 125 467 V10.2.0 (Jul. 2011) "Universal Mobile Telecommunications System (UMTS)"; UTRAN architecture for 3G Home Node B (HNB); Stage 2 (3GPP TS 25.467 version 10.2.0 Release 10) http://www.etsi.org/deliver/etsi_ts/125400_125499/125467/10.02.00_60/ts_125467v100200p.pdf; 60 pages.

3rd Generation Partnership Project; ETSI TS 125 215 V10.0.0 (Apr. 2011) "Universal Mobile Telecommunications System (UMTS)"; Physical layer; Measurements (FDD); (3GPP TS 25.215 version 10.0.0 Release 10) 25 pages.

3rd Generation Partnership Project; "Proposed SID: Further enhancements for HNB and HeNB"; TSG RAN Meeting #51, RP-110456, Mar. 15-18, 2011, Alcatel-Lucent, Kansas City, USA; 6 pages.

3rd Generation Partnership Project; 3GPP TR 37.803 V1.3.0 (May 2012) "Technical Specification Group RAN"; UMTS and LTE; Mobility Enhancements for H(e)NB (Release 11) 7 pages.

3rd Generation Partnership Project; "Update to TR37.803 to V1,3.0 with updates from RAN3#76"; 3GPP TSG-RAN WG3 Meeting #76, R3-121483, May 21-25, 2012, Alcatel-Lucent (Rapporteur), Prague, Czech Republic; 1 page.

3rd Generation Partnership Project; 3GPP TR 37 803 V1.32.0 (May 2012) "Technical Specification Group RAN"; UMTS and LTE; Mobility Enhancements for H(e)NB (Release 11) 127 pages.

3rd Generation Partnership Project; 3GPP TS 25.435 V10.2.0 (Jun. 2011) "Technical Specification Group Radio Access Network"; UTRAN $I_{ub}$ interface user plane protocols for Common Transport Channel data streams (Release 10) 61 pages.

* cited by examiner

Intra-Frequency Measurement Procedure of CSG and Hybrid Cells

Release 10 HNB Architecture.

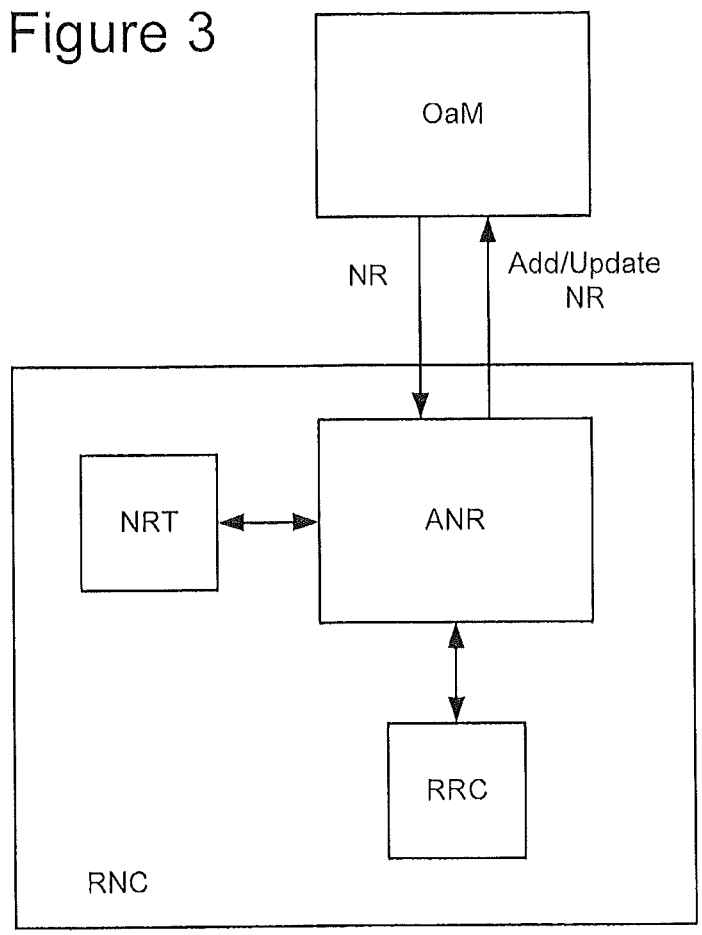
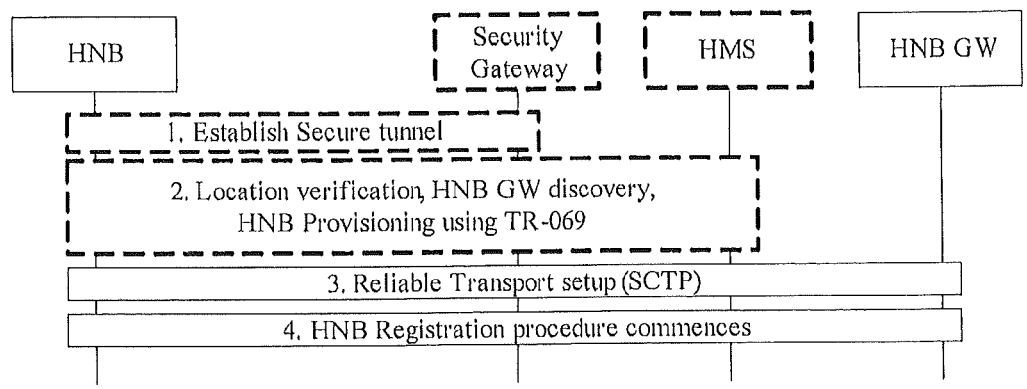
HNB provisioning procedure.

Figure 5

| Information | | Description/Note | Presence | 3GPP Reference |
|---|---|---|---|---|
| RF Information | UARFCNDL | UARFCN (DL) | M | 25.104, sec. 5.4<br>32.642, sec. 6.3.11 |
| | CPICHRSCP | RSCP of CPICH | M | |
| | PSC | Primary Scrambling Code | M | 32.642, sec. 6.3.11 |
| Broadcast Information | PLMN Type | <<GSM-MAP>> or <<ANSI-41>> | M | 25.331, sec. 10.3.1.12 |
| | MCC | Mobile Country Code | M | 24.008<br>32.642, sec. 6.3.10 |
| | MNC | Mobile Network Code | M | 24.008<br>32.642, sec. 6.3.10 |
| | LAC | Location Area Code | M | 24.008, sec. 10.5.1.3<br>32.642, sec. 6.3.10 |
| | RAC | Routing Area Code | M | 24.008, sec. 10.5.1.12.3<br>25.413, sec. 9.2.3.7<br>32.642, sec. 6.3.10 |
| | Cell ID | Cell Identification | M | 25.331, sec. 10.3.2.2 |
| | CSG Cell Information | <Detail Per Rel. 8 RRC Spec.> | O | Applicable to Rel. 8 Compliant Cell Only |

Macrocell Information That The HNB Provides To The HMS From Measurements.

Figure 6

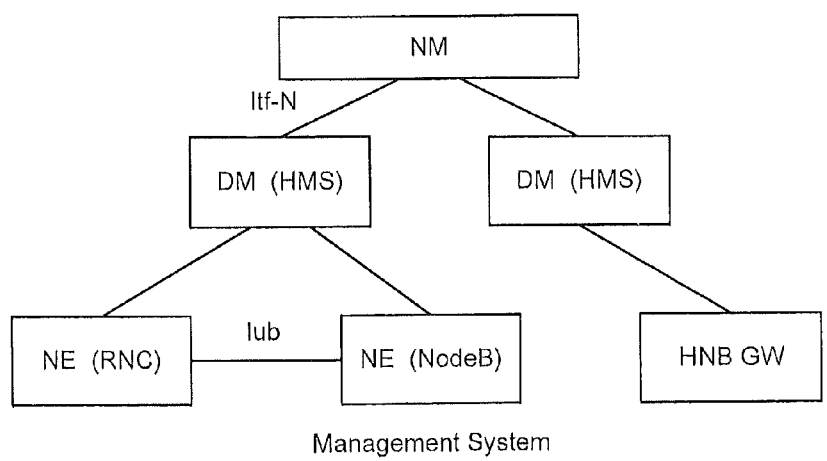

Management System

Figure 9

| Neighbor Relation | Neighbor Cell Identifier (NCI) | No Remove | No HO |
|---|---|---|---|
| 1 | NCI #1 | | |
| 2 | NCI #2 | | X |
| 3 | NCI #3 | X | |
| 4 | NCI #4 | | |
| 5 | NCI #5 | X | |
| *** | *** | *** | *** |

Neighbor Relations Table

Figure 10

| Neighbor Relation | NCI | CSG ID | Cell Access Mode | Adjacent Cell PCSs | Adjacent Cell PCS Signal Strengths | Time Difference | No Remove | No HO |
|---|---|---|---|---|---|---|---|---|
| 1 | NCI #1 | CSG ID #1 | Closed | PCS = 1<br>PCS = 27<br>PCS = 85 | SS#1-1<br>SS#27-1<br>SS#85-1 | TD1 | | |
| 2 | NCI #2 | | | PCS = 1<br>PCS = 5<br>PCS = 85 | SS#1-2<br>SS#5-2<br>SS#85-2 | TD2 | | X |
| 3 | NCI #3 | | | PCS = 98<br>PCS = 213 | SS#98-3<br>SS#213-3 | TD3 | X | |
| 4 | NCI #4 | CSG ID #2 | Hybrid | PCS = 378<br>PCS = 456<br>PCS = 290<br>PCS = 68 | SS#378-4<br>SS#456-4<br>SS#290-4<br>SS#68-4 | TD4 | | |
| 5 | NCI #5 | | Open | PCS = 1 | SS#1-5 | TD5 | X | |
| *** | | | | | | | | |

Enhanced Neighbor Relations Table

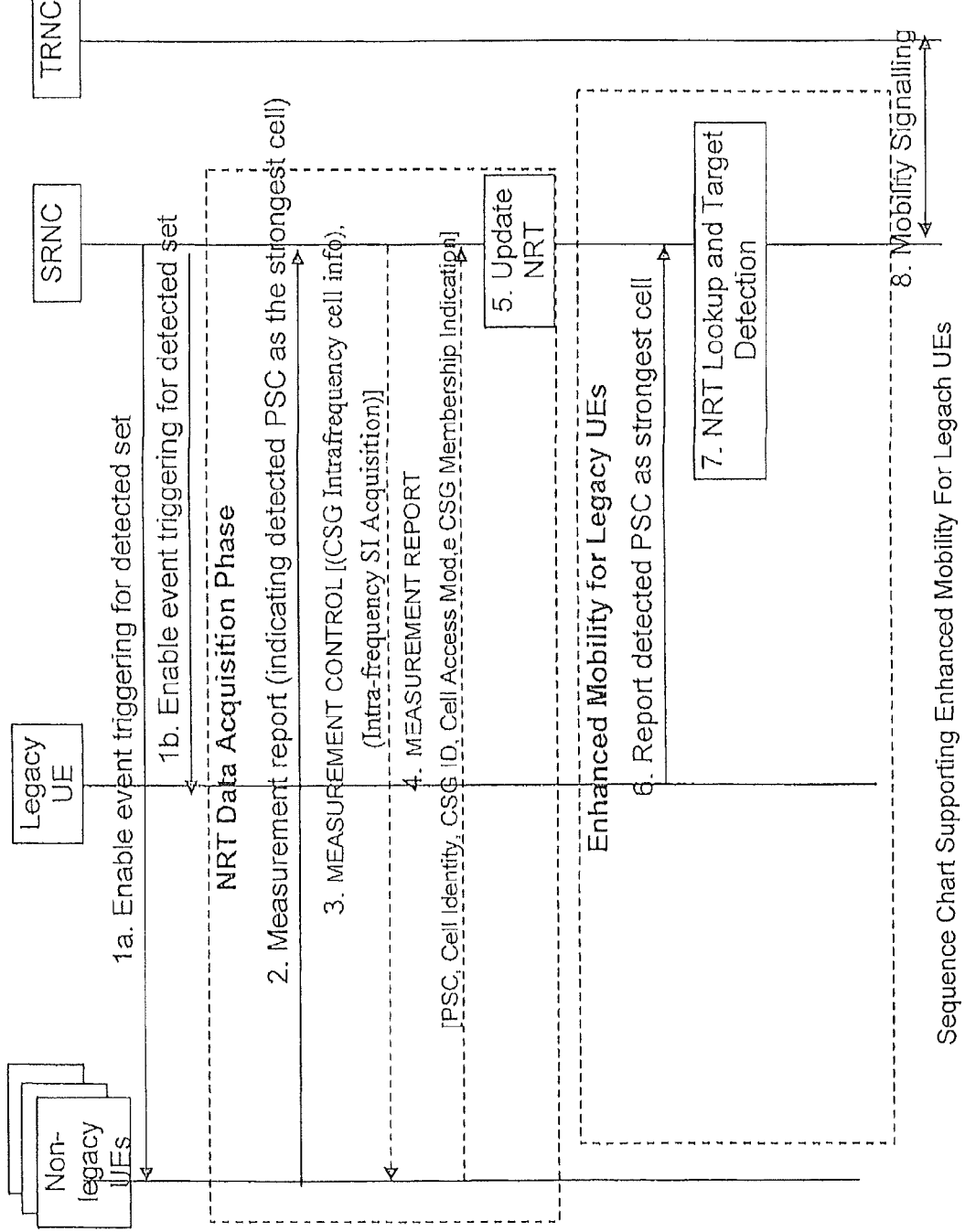

Figure 15

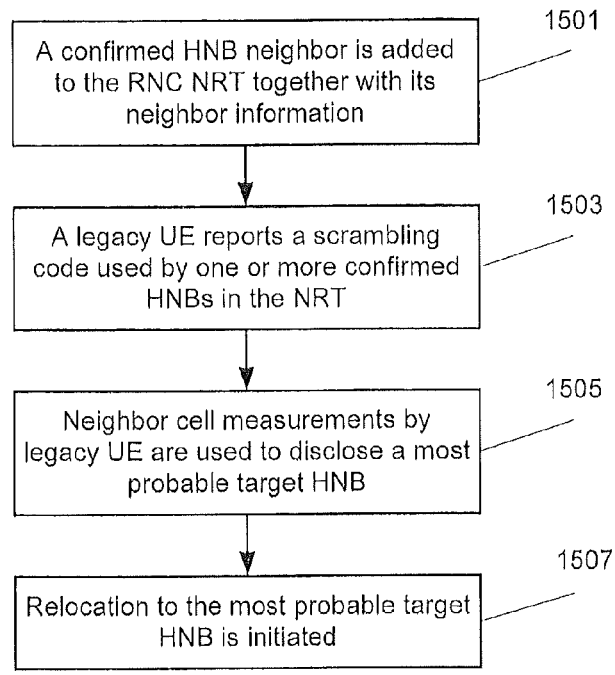

1501 — A confirmed HNB neighbor is added to the RNC NRT together with its neighbor information 1503 — A legacy UE reports a scrambling code used by one or more confirmed HNBs in the NRT 1505 — Neighbor cell measurements by legacy UE are used to disclose a most probable target HNB 1507 — Relocation to the most probable target HNB is initiated

Figure 16

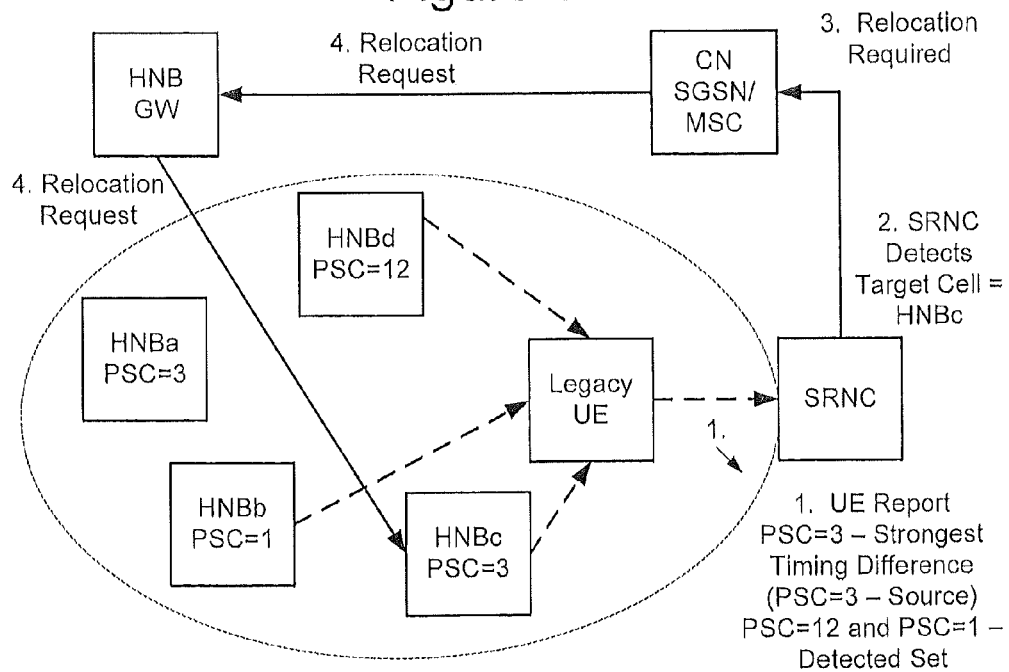

Example of HNB cell disambiguation during legacy UE mobility

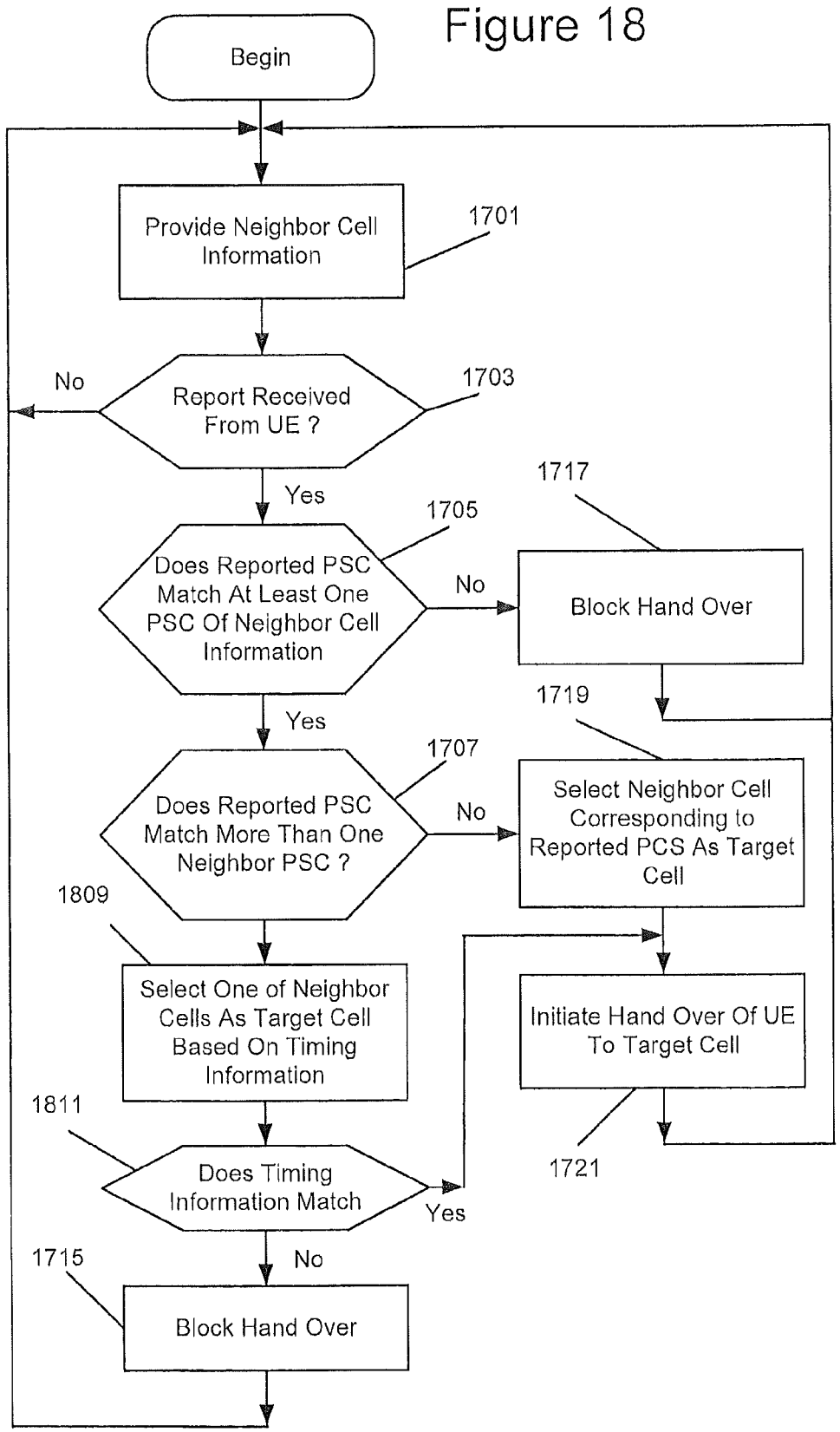

METHODS OF SELECTING TARGET CELLS USING NEIGHBOR CELL INFORMATION AND RELATED NETWORK CONTROLLERS

RELATED APPLICATIONS

The present application is a 35 U.S.C. §371 national stage application of PCT International Application No. PCT/SE2012/051066, filed on Oct. 5, 2012, which claims the benefit of priority from U.S. Application No. 61/553,767 filed Oct. 31, 2011, and from U.S. Application No. 61/554,248 filed Nov. 1, 2011. The disclosures of all of the above referenced applications are hereby incorporated herein in their entireties by reference.

TECHNICAL FIELD

The present disclosure is directed to communications and, more particularly, to wireless communications and related network nodes and wireless terminals.

BACKGROUND

Emerging mobile network trends may call for denser deployments in urban areas, due to increasing traffic and/or user density. Operators are looking to deploy smaller cells (e.g., pico and/or femto cells) in the same areas as macro cells, with varying degrees of "cooperation" and/or integration between them according to the desired level of network performance (so-called "HetNet deployments" or heterogeneous network deployments). An issue in such deployments is to provide increased/optimum mobility to UEs (user equipment nodes, also referred to as wireless terminals) that have different capabilities while providing/ensuring a reduced/lowest level of core network (CN) involvement, to reduce signalling traffic.

In WCDMA (Wide Band Code Division Multiple Access) systems, a UE that supports Release 9 or later releases may be able to provide specific measurements to support mobility towards femto/pico cells. In particular, these UEs may be able to improve mobility towards closed HNB (Home Node B) cells, also known as CSG (Closed Subscriber Group) cells, by providing a Proximity Indication and specific System Information measurements that allow the serving RNC (Radio Network Controller) to disambiguate the target cell and to trigger the appropriate relocation procedures towards the right target. As used herein, the term Serving RNC (SRNC) can refer to both a HNB or an RNC. Moreover, a cell may be referred to as an eNodeB or a base station, an HNB cell may be referred to as an HNB or a home base station, and/or a CSG cell may be referred to as a CSG or a CSG base station. Moreover, an RNC may be implemented as a macro/network base station or an element thereof.

Information concerning specific measurements performed by Release 9 and later UEs can be found in the reference 3GPP TS 25.367 Rel-10 V10.0.0, "Mobility procedures for Home Node B (HNB)," Stage 2, Release 10, 2011-03, and/or in the reference 3GPP TS 25.331 V10.3.1, "Radio Resource Control (RRC); Protocol Specification," Release 10, 2011-05. A graphical description/illustration of how measurement configuration and reporting occur for a Release 9 or later UE handing over to a CSG cell are shown in FIG. 1 below (extracted from the reference 3GPP TS 25.367, cited above).

In message 1 [1. MEASUREMENT CONTROL (Measurement Type=CSG Proximity Detection)], the SRNC configures the UE to report a CSG Proximity Indication flag. When reported, this flag indicates that the UE is close to an accessible CSG cell. In message 2 [MEASUREMENT REPORT (CSG Proximity Indication)], the UE reports the Proximity Indication flag due to having determined that it is in proximity of an accessible CSG cell.

CSG cells are restricted to use a limited range of PSCs (Primary Scrambling Codes). This is due to the PSC split applied between closed CSG cells and any other cell. Hence, due to the limited number of available PSCs and to the high number of closed CSG cells potentially present in a HetNet deployment, there may be a possibility that a PSC is reused between two or more CSG cells in the same neighbourhood.

For the reasons above, the SRNC configures measurements at the UE via message 3 [3. MEASUREMENT CONTROL (CSG Intra-frequency cell information, Intra-frequency SI Acquisition)]. This configuration is meant to make the UE measure the SIBs (System Information Blocks) of the CSG cell in proximity together with the PSC of such cell.

Once the UE performs the measurements, it will report the CSG cell information required by the SRNC in message 4 [4. MEASUREMENT REPORT (PSC, Cell Identity, CSG Member Indication)]. Such information includes the following:

(1) CSG cell's PSC,
(2) CSG cell's CSG ID (CSG Identification), identifying the closed subscribed group to which the CSG cell belongs,
(3) Cell Global Identity (CGI), uniquely identifying the cell in the PLMN (Public Land Mobile Network), and
(4) Membership Status (i.e., the membership of the UE in the detected CSG cell) where this parameter is provided according to the subscriber information the UE has provided at that point in time and it can be set to "member" or "non-member."

With the information above, the SRNC can determine whether the UE is allowed in the detected CSG cell, and it can unequivocally detect such cell by means of the CGI. The SRNC can then proceed with Handover Processing, as discussed, for example, by Alcatel-Lucent, et al., 3GPP TSG-RAN3 Meeting #73, R3-112026, "Macro To Small Cell, Metro Cell Hand-In," Athens Greece, Aug. 22-26, 2011.

For the sake of completeness, it shall be mentioned that once the relocation procedures are triggered, there can be several different types of signalling procedures that can be followed. According to the architecture shown in FIG. 2, mobility signalling towards a CSG cell can either go through the core network or CN (Iu based mobility) or, in case of CSG cell to CSG cell mobility, it can be routed via the Iurh interface without passing through the CN.

As shown in FIG. 2, each NodeB base station may be coupled to a respective radio network controller RNC over an Iub interface, and each radio network controller RNC may be coupled to a core network CN over a respective Iu interface. Moreover, each NodeB base station may support communications with wireless terminals UEs over a Uu air interface(s). While one NodeB base station and one radio network controller are shown by way of example, a radio access network (RAN) may include any number of such elements.

Home NodeB base stations HNB(s) may be coupled to core network CN through a security gateway and a Home NodeB gateway HNB GW. More particularly, each Home NodeB base station HNB may be coupled to HNB GW through the security gateway over a respective Iuh interface, and HNB GW may be coupled to core network CN over an Iu interface. Moreover, each HNB may support communications with wireless terminals UEs over a Uu air interface(s), and different HNB GWs may be coupled over Iurh interfaces.

Pre-Release 9 UEs may be unable to follow the procedures described with respect to FIG. 1. Such UEs will from now on be referred to as "legacy UEs". For these UEs it may be very difficult to disambiguate an HNB target cell at the SRNC. In contrast, Release 9 and later UEs will be referred to as non-legacy UEs.

Legacy UEs can monitor three mutually exclusive categories of cells (and report their PSCs): active set (cells in soft handover or HO), monitored set (cells not in soft HO, but included in the UE's NCL or Neighbour Cell List); and detected set (cells detected by the UE, which are neither in the monitored set nor in the active set). The detected set reporting is applicable only to intra-frequency measurements in CELL_DCH (Cell Dedicated Channel) state for legacy UEs, but later releases also support inter-frequency measurement of detected cells. A UE needs to be able to report the measurements within: a) 200 ms for an already identified cell; b) 800 ms for a new cell in the monitored set; and c) 30 s for a new cell in the detected set (see, 3GPP TS 25.133 V10.4.0, "Requirements For Support Of Radio Resource Management," Release 10, December 2011). The difference in the detection time requirements of cells in the detected set and the monitored set is due to the UE's usage of matched filter measurements to identify the cells, where the filter parameters might be configured for efficient detection of the monitored set only. However, there can be UE implementations where the detection time for both the monitored set and the detected set is quite comparable.

As explained above, even if a legacy UE is able to report detected set cell PSCs there may be more than one cell using a same PSC. Therefore, the SRNC may have difficulty unequivocally identifying a target cell corresponding to a PSC reported by legacy UEs.

A feature that a non-legacy UE may support is to be CSG-capable, namely being able to be configured for System Information (SI) acquisition for any detected cell. The latter is a measurement configuration that was standardised to allow UEs to detect and report System Information of femto cells not necessarily included in the SRNC Neighbour Cell List. As discussed above, there may be a disparity in the behaviour of Release 9 UEs and later releases versus pre-Release 9 UEs for cases of mobility to CSG cells.

Release 9 and later UEs may be configured to report a Proximity Indication flag, signalling that there is an accessible CSG cell in proximity. Further, these UEs may be configured to report, once the CSG cell in proximity is detected, the PSC, CGI, CSG ID and Membership Status of such CSG cell.

With the information above reported by the UE, the SRNC is able to uniquely identify the target cell to which the UE shall be handed over, and it is able to correctly construct mobility messages that can unequivocally trigger preparation of resources at the target before the UE relocates. Alternatively, mechanisms allowing mobility to target cells used for all UE releases is based on the SRNC broadcasting over the serving cell a list of neighbour cells, also known as the Neighbour Cell List (NCL). This list indicates scrambling codes of cells for which the SRNC has all the required information to initiate mobility. Once a UE reports one of the PSCs in the NCL, the RNC can immediately generate the mobility signalling towards the target RNC. However, it has to be noted that the NCL may have a very limited size. For intra-frequency cells, the NCL is limited to 31 entries and for inter-frequency cells it is limited to 32 entries. Therefore, it may not be feasible to include all the cells in a given neighbourhood (CSG cells, small cells, macro cells etc.) in the NCL.

Another relevant background technical aspect is the Automatic Neighbour Relation (ANR) function currently available in WCDMA systems.

The ANR function is enabled by means of keeping a Neighbour Relation Table (NRT) in the SRNC, which lists all the LTE, GSM and 3G cells that are neighbours of the cells served by the SRNC. The NRT is independent from the NCL, namely cells that are present in the NRT may not be present in the NCL. Different instances of the NRT may be kept for each cell served by the RNC.

By way of example (relating to mobility for 3G CSG cells), the case of 3G cells configured in the NRT will be considered.

If a 3G cell is configured in the NRT (Neighbour Relations Table), the following parameters shall be stored in the NRT [as specified in the reference 3GPP TS 25.484 V10.0.0, "Automatic Neighbour Relation (ANR) for UTRAN," Stage 2, Release 10, 2011-07], and shall form the Neighbour Cell Identifier (NCI):

PLMN-Id,
Cell Identifier(C-ID), and
RNC-ID/Extended RNC-ID.

Other pre-configured flags are present for each cell saved in the NRT. These pre-configured flags are listed below.

No Remove: If checked, the RNC shall not remove the Neighbour cell Relation from the NRT.
No HO (Hand Over): If checked, the Neighbour cell Relation shall not be used as a neighbour cell by Intra RNS (Radio Network Subsystem), Inter RNS or Inter RAT (Radio Access Technology) mobility functions in UTRAN (Universal Terrestrial Radio Access Network).

Besides the parameters above, the SRNC managing the NRT may need to know the following parameters concerning each cell in the NRT:

LAC (Location Area Code) and RAC (Routing Area Code), and
frequency information (UARFCN or UTRA Absolute Radio Frequency Channel Number, BCCH ARFCN or Broadcast Control Channel ARFCN, EARFCN or E-UTRA ARFCN)

As described in the reference 3GPP TS 25.484, V10.0.0 (cited above), the SRNC can update its NRT by means of measurements collected by UEs supporting ANR (Automatic Neighbour Relations) capabilities. These UEs will collect measurements about cells monitored while attached to a given serving cell. The UEs will report such measurements in logs whenever the network believes it is opportune for the UE to report such information. The RNC to which the ANR measurement log will be reported will be responsible to distribute relevant measurements to the RNCs that can benefit from it, e.g., to those RNC that can update their NRT by means of such measurements.

The logged measurements reported by the UE (and specified in the reference 3GPP TS 25.331 V10.3.1, cited above) also include the PSC of each reported cell. Therefore, even though the NRT specified in the reference 3GPP TS 25.484, V10.0.0 (cited above) does not include a PSC for each included cell, an RNC can associate a PSC from the UE reported measurements to each newly created entry of its NRT.

The NRT currently specified in the reference 3GPP TS 25.484, V10.0.0 (cited above) is used to identify target neighbour cells by means of PSC reporting by the UE. Namely, once the UE reports the PSC of a cell included in the NRT, the SRNC immediately retrieves all the details about that cell. Such details can be used to construct the mobility messages needed to relocate the UE to the target cell, without requiring the UE to perform any further measurement.

However, the current NRT may be unable to help in cases of legacy UEs relocating to cells not uniquely identifiable by their PSC. In fact, if a legacy UE reports the PSC of a target cell to its SRNC and if this PSC is present more than once in the NRT, the SRNC may have no means to disambiguate the target because legacy UEs cannot receive a measurement control configuration allowing reporting of System Information of the detected cell. In contrast, Release 9 UEs and later releases can be configured in such way as described in the reference 3GPP TS 25.367 V10.0.0 (cited above).

A legacy UE, although not able to be configured to report System Information of a cell for which the PSC has been detected, can report the PSC and the CPICH (Common Pilot Indicator Channel) signal strength of any cell in range, namely also of cells that are not included in the Neighbour Cell List (NCL) broadcast by the serving cell. The range of cells for which reported PSCs are not included in the NCL is called the "Detected Set Cells".

In the reference Qualcomm Inc., et al., 3GPP TSG RAN WG3 #73bis, R3-112600, "Legacy UE Macro to HNB Active Hand-in," Zhuhai, China, Oct. 10-14, 2011, and in the reference Alcatel-Lucent, et al., 3GPP TSG-RAN3 Meeting #73, R3-112026 (cited above), solutions to support mobility of legacy UEs to small cells in need of disambiguation are presented. Methods followed in both of these references may include the operations listed below.

1. Configuring a SRNC with information about which HNB GW (Gateway) corresponds to a given range of PSCs.
2. Configuring the target HNB GW with information concerning each pair of cells where one cell is associated to a HNB served by the HNB GW and the other is a cell not under the HNB GW domain, with this information including:
   (a) Frame timing difference between cell under HNB GW domain and neighbour cell;
   (b) Cell ID of each cell under HNB GW domain, which is neighbouring the cell not under HNB GW domain; and
   (c) Pilot channel information of each cell under HNB GW domain, i.e. Primary Scrambling Code, ARFCN, CPICH RSCP (Received Channel Power Code).
3. Enhancing the SRNC to allow it to include in the mobility messages towards the target HNB GW the information listed above in bullets 2, 2(a), 2(b), and 2(c).
4. Enhancing the HNB GW to disambiguate the target cell on the basis of the information received from source RNC via mobility messages.

Established NRT information in the RNC may be aligned with the OaM (Operations and Maintenance) system, as shown in FIG. 3. This also enables NRT information to be added from the OaM system to the NRT in the RNC. As shown in FIG. 3, each radio network controller RNC may include a neighbor relation table NRT and a radio resource control RRC cooperating with an ANR (automatic neighbor relation function), and neighbor relation NR information may be shared between different radio network controllers through OaM system.

The provisioning procedure of HNBs may be as described in the reference 3GPP TS 25.467 V10.2.0, "UTRAN Architecture For 3G Home Node B (HNB)," Stage 2, Release 10, 2011-07, illustrated by FIG. 4. First, a secure tunnel is established to the security gateway of FIG. 2. Second, the HNB establishes contact with and provides location information to the HNB Management System (HMS) (including location verification, GW discovery, and HNB provisioning using TR-069). Such location information may include measurements obtained from embedded UE functionality in the HNB. Third, reliable transport setup (SCTP) may be provided between the HNB and the HNB GW. Fourth, an HNB registration procedure may commence.

The table of FIG. 5 identifies the radio frequency and broadcast information that the HNB can provide to the HMS (HNB Management System). In other words, the table of FIG. 5 identifies macrocell information that the HNB provides to the HMS from measurements.

The OaM system may include logical components to manage each domain. Such domain managers include the Operation Support System to manage the UTRAN and the HNB Management System to manage the HNBs. The combined network domains are managed by the Network Management System (NMS) as illustrated by FIG. 6.

As discussed above, Pre-release 9 UEs may be unable to provide enough information to the SRNC to allow disambiguation of a target cell not included in the NCL broadcast by the serving cell.

Operations discussed above may have significant impact on current infrastructure because changes may be required both at RNCs and at HNB GWs. Moreover, these operations may contradict one of the basic assumptions of mobility in 3GPP systems, i.e., that the source RAN (Radio Access Network) is responsible to decide which cell is the target of the mobility procedure. Finally, these operations may not address the issue of legacy UEs, which may be unaware of closed subscribed group cells, and as such, may be unaware of whether they can access such closed cells or not, repeatedly attempting access to cells that are not accessible.

A legacy UE may at best report information about the PSCs of cells monitored in its neighbourhood and not included in the NCL, i.e. a legacy UE may report the Detected Set Cells. However, the SRNC might not know the system information of the cell corresponding to the reported PSC. Alternatively, the SRNC might know the details of a cell neighbouring the serving cell and having the same PSC reported by the UE, but it might be the case that there is another cell in the neighborhood sharing the same PSC. The SRNC may be unable to detect such duplication and/or to prevent/reduce relocation attempts towards an incorrect target(s).

SUMMARY

It may therefore be an object to address at least some of the above mentioned disadvantages and/or to improve performance in a wireless communication system.

According to some embodiments discussed herein, a method of operating a radio access network may include providing neighbor cell information identifying neighbor cells of a source cell and respective neighbor scrambling codes of the neighbor cells. A report may be received from a wireless terminal through the source cell with the report identifying a reported scrambling code of a reported cell and at least one detected scrambling code of at least one detected cell other than the reported cell. One of the neighbor cells may be selected as a target cell based on the reported scrambling code, the at least one detected scrambling code, and the neighbor cell information.

Responsive to selecting one of the neighbor cells as the target cell, a handover of communications may be initiated for the wireless terminal from the source cell to the target cell. Where a legacy wireless terminal is unable to report an identification of a cell (base station) of a closed subscriber group and the reported scrambling code matches more than one neighbor cell (of the source cell), for example, one of the neighbor cells with the matching scrambling code may thus be selected based on the scrambling code of the detected cell and the neighbor cell information. Stated in other words, the neighbor cell information may be used to disambiguate multiple neighbor cells having a same primary scrambling code when a legacy wireless terminal does not report an identification of a potential target cell for hand over.

The neighbor cell information may identify respective adjacent scrambling codes of adjacent cells for the neighbor cells. Selecting one of the neighbor cells may thus include selecting one of the neighbor cells as the target cell based on comparing the reported scrambling code with the neighbor scrambling codes of the neighbor cell information and based on comparing the at least one detected scrambling code with the adjacent scrambling codes of the neighbor cell information.

Selecting one of the neighbor cells may include selecting one of the neighbor cells as the target cell based on the reported scrambling code and the at least one detected scrambling code responsive to the reported scrambling code of the reported cell matching more than one of the neighbor scrambling codes of neighbor cells from the neighbor cell information for the source cell. Responsive to the reported scrambling code of the reported cell matching only one of the neighbor scrambling codes from the neighbor cell information for the source cell, one of the neighbor cells corresponding to the reported scrambling code may be selected as the target cell without comparing the at least one detected scrambling code to the neighbor cell information.

The neighbor cell information may further include respective adjacent scrambling codes of adjacent cells for the neighbor cells and timing differences between the source cell and the neighbor cells. The report may include a reported timing difference between the reported cell and the source cell, and selecting one of the neighbor cells may include selecting one of the neighbor cells as the target cell based on comparing the reported scrambling code with the neighbor scrambling codes of the neighbor cell information, based on comparing the at least one detected scrambling code with the adjacent scrambling codes of the neighbor cell information, and based on comparing the reported timing difference with at least one of the timing differences of the neighbor cell information.

The neighbor cell information may further include respective adjacent scrambling codes and signal strengths of adjacent cells for the neighbor cells, and the report may include a reported signal strength for the at least one detected scrambling code. Selecting one of the neighbor cells may include selecting one of the neighbor cells as the target cell based on comparing the reported scrambling code with the neighbor scrambling codes of the neighbor cell information, based on comparing the at least one detected scrambling code with the adjacent scrambling codes of the neighbor cell information, and based on comparing the reported signal strength with at least one of the adjacent signal strengths of the neighbor cell information.

The wireless terminal may be a first wireless terminal (e.g., a legacy wireless terminal), and the report may be a first report. Providing the neighbor cell information may include receiving a second report from a second wireless terminal (e.g., a non-legacy wireless terminal) through the source cell, and the second report may include the reported scrambling code of the reported cell and the at least one detected scrambling code of the at least one detected cell. Moreover, providing the neighbor cell information may include adding the reported scrambling code of the reported cell and the at least one detected scrambling code to the neighbor cell information for the source cell responsive to the second report. Information provided by reports from non-legacy wireless terminals may thus be used to support target cell selection for legacy wireless terminals.

The second report may include a timing difference between the reported cell and the source cell, and providing the neighbor cell information may include adding the timing difference to the neighbor cell information responsive to the second report. In addition or in an alternative, the second report may include a signal strength associated with the at least one detected scrambling code, and providing the neighbor cell information may include adding the signal strength to the neighbor cell information as a signal strength of an adjacent cell for a neighbour cell responsive to the second report.

According to some other embodiments discussed herein, a radio network controller of a radio access network may include means for providing neighbor cell information identifying neighbor cells of a source cell and respective neighbor scrambling codes of the neighbor cells. The radio network controller may also include means for receiving a report from a wireless terminal through the source cell wherein the report identifies a reported scrambling code of a reported cell and at least one detected scrambling code of at least one detected cell other than the reported cell. In addition, means may be provided for selecting one of the neighbor cells as a target cell based on the reported scrambling code, the at least one detected scrambling code, and the neighbor cell information.

Means may be provided for initiating a handover of communications for the wireless terminal from the source cell to the target cell responsive to selecting one of the neighbor cells as the target cell.

The neighbor cell information may further identify respective adjacent scrambling codes of adjacent cells for the neighbor cells. Moreover, the means for selecting one of the neighbor cells may include means for selecting one of the neighbor cells as the target cell based on comparing the reported scrambling code with the neighbor scrambling codes of the neighbor cell information and based on comparing the at least one detected scrambling code with the adjacent scrambling codes of the neighbor cell information.

The means for selecting one of the neighbor cells may include means for selecting one of the neighbor cells as the target cell based on the reported scrambling code and the at least one detected scrambling code responsive to the reported scrambling code of the reported cell matching more than one of the neighbor scrambling codes of neighbor cells from the neighbor cell information for the source cell.

The neighbor cell information may further include respective adjacent scrambling codes of adjacent cells for the neighbor cells and timing differences between the source cell and the neighbor cells. The report may include a reported timing difference between the reported cell and the source cell. The means for selecting one of the neighbor cells may include means for selecting one of the neighbor cells as the target cell based on comparing the reported scrambling code with the neighbor scrambling codes of the neighbor cell information, based on comparing the at least one detected scrambling code with the adjacent scrambling codes of the neighbor cell information, and based on comparing the reported timing difference with at least one of the timing differences of the neighbor cell information.

The neighbor cell information may further include respective adjacent scrambling codes and signal strengths of adjacent cells for the neighbor cells, wherein the report includes a reported signal strength for the at least one detected scrambling code, and wherein the means for selecting one of the neighbor cells comprises means for selecting one of the neighbor cells as the target cell based on comparing the reported scrambling code with the neighbor scrambling codes of the neighbor cell information, based on comparing the at least one detected scrambling code with the adjacent scrambling codes of the neighbor cell information, and based on comparing the reported signal strength with at least one of the adjacent signals strengths of the neighbor cell information.

The wireless terminal may be a first wireless terminal (e.g., a legacy wireless terminal), and the report may be a first report. The means for providing the neighbor cell information may include means for receiving a second report from a second wireless terminal (e.g., a non-legacy wireless terminal) through the source cell, and the second report may include the reported scrambling code of the reported cell and the at least one detected scrambling code of the at least one detected cell. The means for providing the neighbor cell information may include means for adding the reported scrambling code of the reported cell and the at least one detected scrambling code to the neighbor cell information for the source cell responsive to the second report.

The second report may include a timing difference between the reported cell and the source cell, and the means for providing the neighbor cell information may include means for adding the timing difference to the neighbor cell information responsive to the second report. In addition or in an alternative, the second report may include a signal strength associated with the at least one detected scrambling code, and the means for providing the neighbor cell information may include means for adding the signal strength to the neighbor cell information as a signal strength of an adjacent cell for a neighbour cell responsive to the second report.

According to still other embodiments discussed herein, a radio network controller of a radio access network may include a processor configured to provide neighbor cell information identifying neighbor cells of a source cell and respective neighbor scrambling codes of the neighbor cells. The processor may be further configured to receive a report from a wireless terminal through the source cell with the report identifying a reported scrambling code of a reported cell and at least one detected scrambling code of at least one detected cell other than the reported cell. The processor may also be configured to select one of the neighbor cells as a target cell based on the reported scrambling code, the at least one detected scrambling code, and the neighbor cell information.

According to yet other embodiments discussed herein, a method of operating a radio access network may include providing neighbor cell information identifying neighbor cells of a source cell, respective neighbor scrambling codes of the neighbor cells, and timing differences between the source cell and the neighbor cells. A report may be received from a wireless terminal through the source cell with the report identifying a reported scrambling code of a reported cell and a reported timing difference between the reported cell and the source cell. One of the neighbor cells may be selected as a target cell based on the reported scrambling code, the reported timing difference, and the neighbor cell information.

Responsive to selecting one of the neighbor cells as the target cell, a handover of communications for the wireless terminal from the source cell to the target cell may be initiated.

Selecting one of the neighbor cells may include selecting one of the neighbor cells as the target cell based on comparing the reported scrambling code with the neighbor scrambling codes of the neighbor cell information, and based on comparing the reported timing difference with at least one of the timing differences of the neighbor cell information.

The neighbor cell information may further include respective adjacent scrambling codes of adjacent cells for the neighbor cells, and the report may identify at least one detected scrambling code of at least one detected cell. Selecting one of the neighbor cells may further include selecting one of the neighbor cells as the target cell based on comparing the reported scrambling code with the neighbor scrambling codes of the neighbor cell information, based on comparing the at least one detected scrambling code with the adjacent scrambling codes of the neighbor cell information, and based on comparing the reported timing difference with at least one of the timing differences of the neighbor cell information.

Selecting one of the neighbor cells may include selecting one of the neighbor cells as the target cell based on the reported scrambling code and the neighbor cell information responsive to the reported scrambling code of the reported cell matching more than one of the neighbor scrambling codes of neighbor cells from the neighbor cell information for the source cell.

According to more embodiments discussed herein, a radio network controller of a radio access network may include means for providing neighbor cell information identifying neighbor cells of a source cell, respective neighbor scrambling codes of the neighbor cells, and timing differences between the source cell and the neighbor cells. The radio network controller may also include means for receiving a report from a wireless terminal through the source cell wherein the report identifies a reported scrambling code of a reported cell and a reported timing difference between the reported cell and the source cell. The radio network controller may further include means for selecting one of the neighbor cells as a target cell based on the reported scrambling code, the reported timing difference, and the neighbor cell information.

According to still more embodiments discussed herein, a radio network controller of a radio access network may include a processor configured to provide neighbor cell information identifying neighbor cells of a source cell, respective neighbor scrambling codes of the neighbor cells, and timing differences between the source cell and the neighbor cells. The processor may be further configured to receive a report from a wireless terminal through the source cell wherein the report identifies a reported scrambling code of a reported cell and a reported timing difference between the reported cell and the source cell. The processor may also be configured to select one of the neighbor cells as a target cell based on the reported scrambling code, the reported timing difference, and the neighbor cell information.

BRIEF DESCRIPTION OF THE DRAWINGS

The accompanying drawings, which are included to provide a further understanding of the disclosure and are incorporated in a constitute a part of this application, illustrate certain non-limiting embodiment(s) of inventive concepts. In the drawings:

FIG. 3 is a block diagram illustrating a neighbour relation table that may be aligned with an Operations and Maintenance (OaM) system;

FIG. 4 is a diagram illustrating Home NodeB (HNB) provisioning according to 3GPP TS 25.467 V10.2.0 "UTRAN Architecture For 3G Home NodeB (HNB)," Release 10, 2011-06;

FIG. 5 is a table identifying macrocell information that a Home NodeB (HNB) provides to a HNB Management System (HMS) from measurements;

FIG. 6 is a block diagram of a management system;

FIG. 9 is an example of a Neighbor Relation Table (NRT);

FIG. 10 is an example of an enhanced Neighbor Relation Table according to some embodiments;

FIG. 11 is a signalling diagram illustrating a sequence of messages supporting enhanced mobility for legacy wireless terminals (UEs) according to some embodiments;

FIG. 15 is a flow chart illustrating mobility operations according to some embodiments;

FIG. 16 is a schematic block diagram illustrating radio access network elements and operations thereof disambiguating an HNB cell during legacy wireless terminal (UE) mobility according to some embodiments; and FIGS. 17 and 18 are flow charts illustrating operations of a radio access network supporting mobility for a legacy wireless terminal (UE) according to some embodiments.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of inventive concepts to those skilled in the art. It should also be noted that these embodiments are not mutually exclusive. Components from one embodiment may be tacitly assumed to be present/used in another embodiment.

For purposes of illustration and explanation only, these and other embodiments of inventive concepts are described herein in the context of operating in a RAN that communicates over radio communication channels with wireless terminals (also referred to as UEs). It will be understood, however, that inventive concepts are not limited to such embodiments and may be embodied generally in any type of communication network. As used herein, a legacy or non-legacy wireless terminal (also referred to as a UE) can include any device that receives data from a communication network, and may include, but is not limited to, a mobile telephone ("cellular" telephone), laptop/portable computer, pocket computer, hand-held computer, and/or desktop computer.

In some embodiments of a RAN, several base stations can be connected (e.g., using an Iub interface provided over landlines and/or radio channels) to a radio network controller (RNC). The radio network controller RNC, also sometimes termed a base station controller (BSC), supervises and coordinates various activities of the plural base stations (also referred to as NodeBs or NodeB base stations) connected thereto. The radio network controller may be connected to a core network CN, for example, using an Iu interface.

Figure 7:
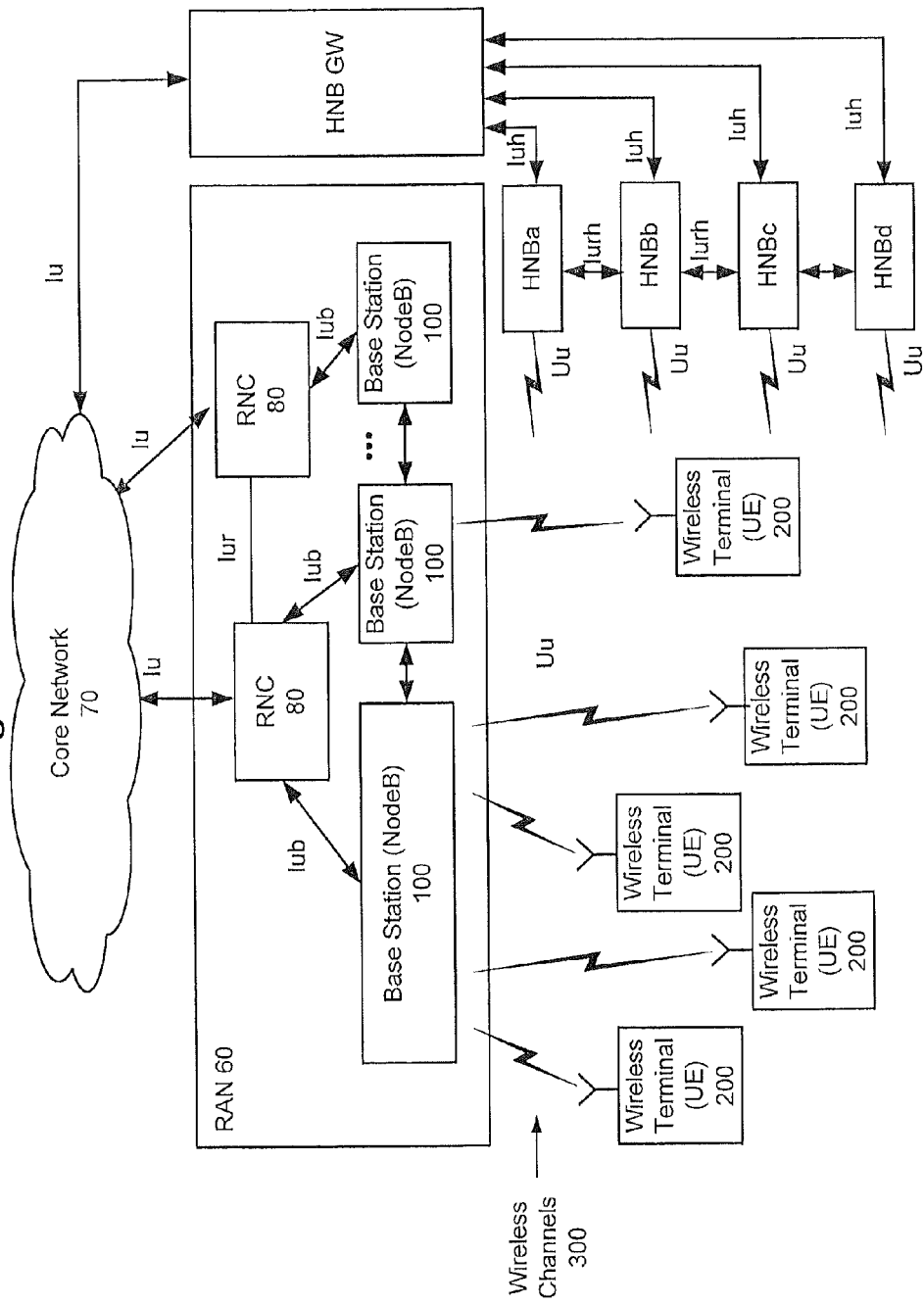
FIG. 7 is a block diagram illustrating elements of a radio access network according to some embodiments.

FIG. 7 is a block diagram of a communication system that is configured to operate according to some embodiments of inventive concepts. An example RAN 60 is shown that may be a Universal Terrestrial Radio Access Network (UTRAN). Radio base stations (e.g., NodeB base stations) 100 may be connected directly to one or more core networks (CNs) 70, and/or radio base stations 100 may be coupled to core networks (CNs) 70 through one or more radio network controllers (RNCs). As shown in FIG. 7, base stations 100 and RNCs 80 may be coupled over respective Iub interfaces, and RNCs 80 and core network (CN) 70 may be coupled over respective Iu interfaces. In some embodiments, functionality of a radio network controller(s) may be performed by radio base stations 100. Radio base stations 100 communicate over wireless channels 300 providing Uu interfaces with wireless terminals (also referred to as user equipment nodes or UEs) 200 that are within their respective communication service cells (also referred to as coverage areas).

Figure 2:
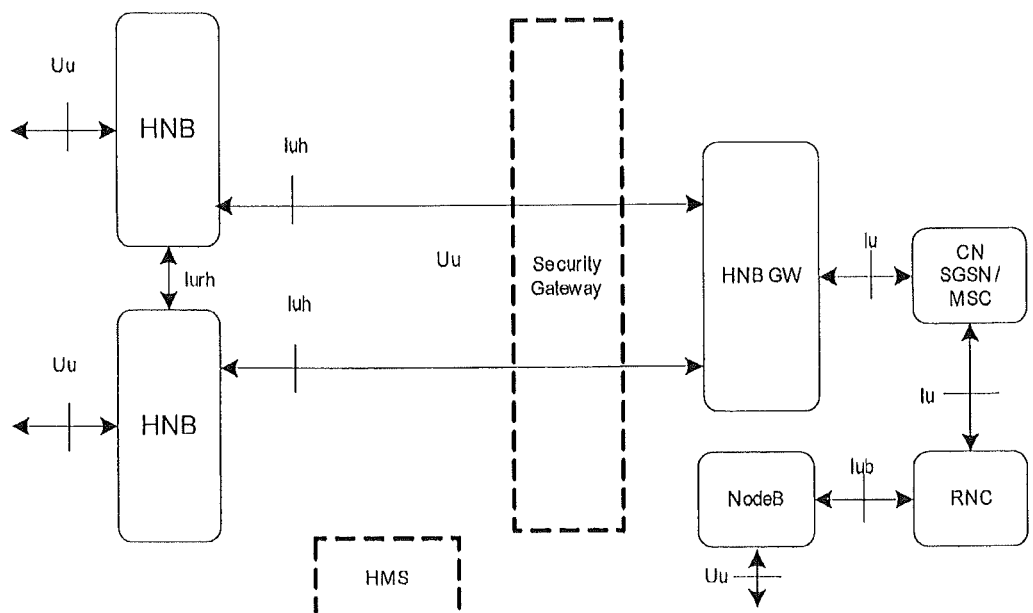
FIG. 2 is a schematic block diagram illustrating a release 10 Home NodeB (HNB) architecture.

As further shown in FIG. 7, communications for one or more of wireless terminals (UEs) 200 may be provided through a Home NodeB HNB (also referred to as a home base station, a pico cell, a femto cell, etc.). More particularly, wireless communications between a wireless terminal UE and an HNB may be provide over a Uu interface. Moreover, each HNB may be coupled to an HNB gateway HNB GW over an Iuh interface, and HNB GW may be coupled to core network 70 over an Iu interface. Iu, Iub, Iuh, and Uu interfaces are discussed above with respect to FIG. 2. While not shown in FIG. 7, a security gateway may be provided between HNB GW and core network 70.

Figure 8:
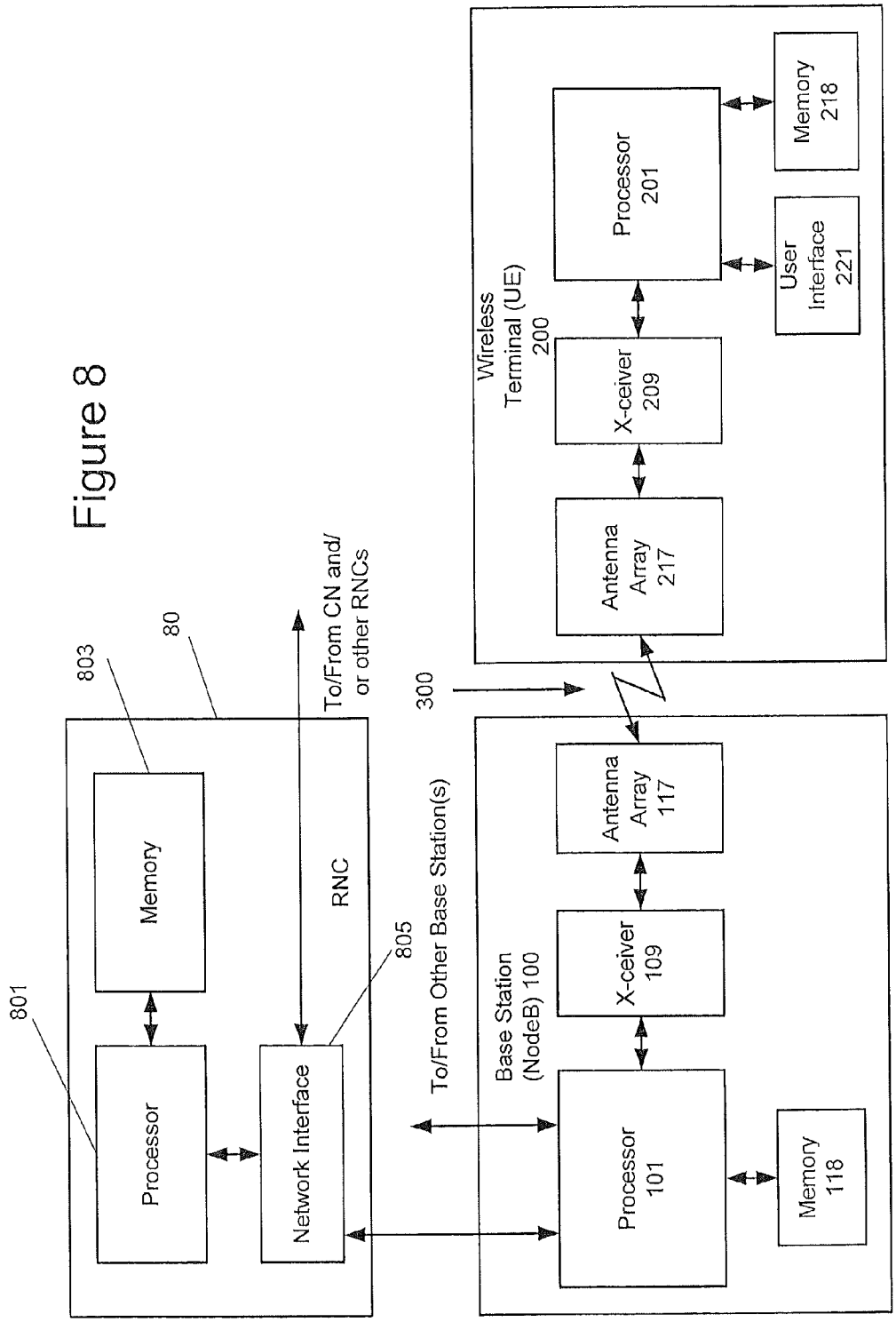
FIG. 8 is a block diagram illustrating a radio network controller (RNC), a base station (NodeB), and a wireless terminal (UE) according to some embodiments.

FIG. 8 is a block diagram of a radio network controller RNC 80, a base station 100, and a wireless terminal 200 of FIG. 7, with base station 100 and wireless terminal 200 in communication over wireless channel 300 (providing a Uu interface) according to some embodiments of inventive concepts. As shown, base station 100 may include transceiver 109 coupled between processor 101 and antenna array 117 (e.g., including multiple antennas), and memory 118 coupled to processor 101. Moreover, wireless terminal 200 may include transceiver 209 coupled between antenna array 217 and processor 201, and user interface 221 and memory 218 may be coupled to processor 201. Accordingly, base station processor 101 may transmit communications through transceiver 109 and antenna array 117 for reception at wireless terminal processor 201 through antenna array 217 and transceiver 209. In the other direction, wireless terminal processor 201 may transmit communications through transceiver 209 and antenna array 217 for reception at base station processor 101 through antenna array 117 and transceiver 109. Wireless terminal 200 of FIG. 8, for example, may be a cellular radiotelephone, a smart phone, a laptop/netbook/tablet/handheld computer, or any other device providing wireless communications. User interface 211, for example, may include a visual display such as an liquid crystal display, a touch sensitive visual display, a keypad, a speaker, a microphone, etc.

Radio network controller 80 may include processor 801 coupled to memory 803 and network interface 805. Network interface 805, for example, may provide coupling between processor 801 and base station processor 101, between processor 801 and core network 70, and/or between processor 801 and other radio network controllers. Radio network controller 80 may thus provide downlink communications from core network 70 to be transmitted by base station 100 to wireless terminal 200, and base station 100 may provide uplink communications (received from wireless terminal 200) to be passed though radio network controller 80 to core network 70 and/or another radio network controller.

According to some embodiments discussed herein, RNCs may update their NRT (maintained in memory 803) by means of system information measurement reports provided by Release 9 and later UEs and/or the OaM system. In addition, the NRT may include a much larger set of cells than what is broadcast over the NCL.

Further, for each Neighbour Relation n, corresponding to cell-n with PSC-n, included in the NRT, the PSCs of the cells neighbouring such cell may be included. The latter information can be acquired by a combination of monitored set of cells (i.e. monitored cells included in the NCL) and Detected Set Cells reported by legacy and non-legacy UE measurement reports. Moreover, for each cell entry in the NRT, the timing difference between such cell and the serving cell (for which the NRT is kept at SRNC) may be included in the NRT. The timing difference can be acquired via UE measurements provided by legacy and non legacy UEs.

With the Detected Set Cells, the SRNC can look up the NRT, and if PSC-n reported initially by the UE corresponds to one of the entries in the NRT and if some or all of the Monitored Set Cells and/or Detected Set Cells reported by the UE corresponds to the neighbour PSCs stored for Cell-n in the NRT, then the SRNC can initiate relocation towards the target identified in the NRT. As a further check, the SRNC can verify that the timing difference between serving cell and identified target cell, reported by the UE, matches the timing difference value for the identified cell in the NRT.

Further, information about the CSG ID and Cell Access Mode reported by non-legacy UEs via the system information acquisition measurement reports or established via the OaM system may be added to the NRT. With such information, the SRNC may be able to better reduce/prevent relocation of legacy UEs to non accessible CSG cells.

The table of FIG. 9 shows a sample NRT in the RNC according to current specifications. There is one table for each cell/sector of the base stations controlled by the RNC. According to some embodiments, the NRT may be extended to the one shown in the table of FIG. 10. In the enhanced NRT, the RNC may also keep track of the reported CSG ID, cell access mode, and the PSCs of other neighbour cells which were also reported by UEs within the same measurement report that included the corresponding neighbour cell. Optionally, a time difference between the neighbour cell and the cell to which the NRT belongs to, can also be included.

The additional information shown in the table of FIG. 10 does not necessarily need to be stored as part of the NRT. This information may simply be stored by the RNC in a way that is independent from the NRT, but still linked to the neighbour cells included in the NRT.

FIG. 11 shows a message sequence chart demonstrating how the NRT may be enhanced for mobility support of legacy UEs via UE measurement reports and how the SRNC could make use of such enhanced NRT. In FIG. 11 (Example of Sequence Chart for support of enhanced mobility for legacy UEs), a message sequence chart demonstrating how the NRT may be enhanced for target selection purposes via UE measurement reports and how the SRNC may make use of such enhanced NRT is shown. Details of the message sequences in these figures are discussed below.

In first embodiments (see, FIGS. 10 and 11), the SRNC acquires System Information (SI) of a given cell via configuring measurements on a non-legacy UE and receiving a measurement report including the SI of the detected cell. More particularly, SNRC may transmit Message 1*a* to enable event triggering for detected set at a non-legacy UE, and in response, the non-legacy UE may transmit Message 2 providing a measurement report indicating the detected PSC as the strongest cell. This cell will be named Cell-n for the sake of clarity. In order to make use of the detected set reporting functionality that is already available in the standards, both legacy and non-legacy UEs are configured to enable event triggering for reported cells (messages 1*a* and 1*b* of FIG. 11). This can be specified by using the Triggering condition 2 Information Element in the Intra-/Inter-frequency measurement reporting configuration.

Since the UEs are setup so that cells in the detected set can trigger measurement reports, the SRNC will be getting measurement reports that indicate a detected cell as the best cell, e.g., having the strongest PSC (Message 2 of FIG. 11). In this measurement report, the UE can also indicate a certain number of cells (the number of which can be configured) that also have good radio conditions, whether the cells are in the monitored set or detected set. From this information, the SRNC can start forming a fingerprint for the reported cell (i.e., the List of Neighbour PSCs column in the table of FIG. 10). The SRNC will update this fingerprint whenever a message 2 is received from a UE. Note that the information in message 2 of FIG. 11 may be also retrieved by legacy UEs reporting PSCs of cells in their surroundings. After a certain period of time, this fingerprint will converge and no new entries will be available. However, further enhancements can be envisioned where instead of just the PSCs, the signal strengths of these other neighbours relative to the concerned neighbour may also be kept. Thus, it may be possible to differentiate two entries in the table of FIG. 10, even though they have the same cells in the List of Neighbour PSCs column.

Additionally, the SRNC also instructs the non-legacy UEs to initiate System Information acquisition of the detected cell (message 3 in FIG. 11). More particularly, the Measurement Control message (message 3) of FIG. 11 may request intra-frequency cell information and intra-frequency SI acquisition. The UE performs the system information acquisition and sends the information as a measurement report (including PCS, Cell identity, CSG ID, cell access mode, and CSG membership indication) towards the SRNC (message 4 of FIG. 11). From this, the SRNC will be able to fill the NCI (Neighbor Cell Identifier), CSG-ID and Cell Access mode columns of the table of FIG. 10. It should be noted that even though the SRNC might have to receive several measurement reports (message 2) from different UEs to get the fingerprint information right, the reception of just one message 4 measurement report from a certain UE is sufficient. In case the information acquired via message 2 and message 4 measurement reports in FIG. 11 are not stored in the NRT, the RNC can simply store it in a database linked to the cells listed in the NRT.

Once the NRT has been updated as explained above, support of mobility towards cells not included in the NCL can be provided by the SRNC. When a -legacy UE reports a detected PSC of a target cell (message 6 of FIG. 11), the SRNC can look up the NRT of FIG. 10 (Step 7 of FIG. 11), trying to find a cell with PSC=PSC-n and with the List of neighbour PSCs including all or part of the PCSs of the other cells included in this measurement report. Once the target cell is found in the NRT, the SRNC can start mobility procedures (mobility signalling) towards that target cell (Step 8 of FIG. 11).

In case the NRT look up process does not lead to determination of a single target cell, the SRNC can initiate relocation preparation procedures towards all the potential target cells identified (i.e. step 8 of FIG. 11 can be carried out for all potential targets identified).

In second embodiments (see, FIGS. 10 and 12), the SRNC may also facilitate the handover process by filtering out targets not relevant to a legacy UE. With the updated NRT, the SRNC is able to block a legacy UE from relocating to a target cell supporting a CSG ID for which a previous pre-set number of relocations (optionally occurring in a pre-set time window) have failed due to lack of UE's access rights.

Figure 12:
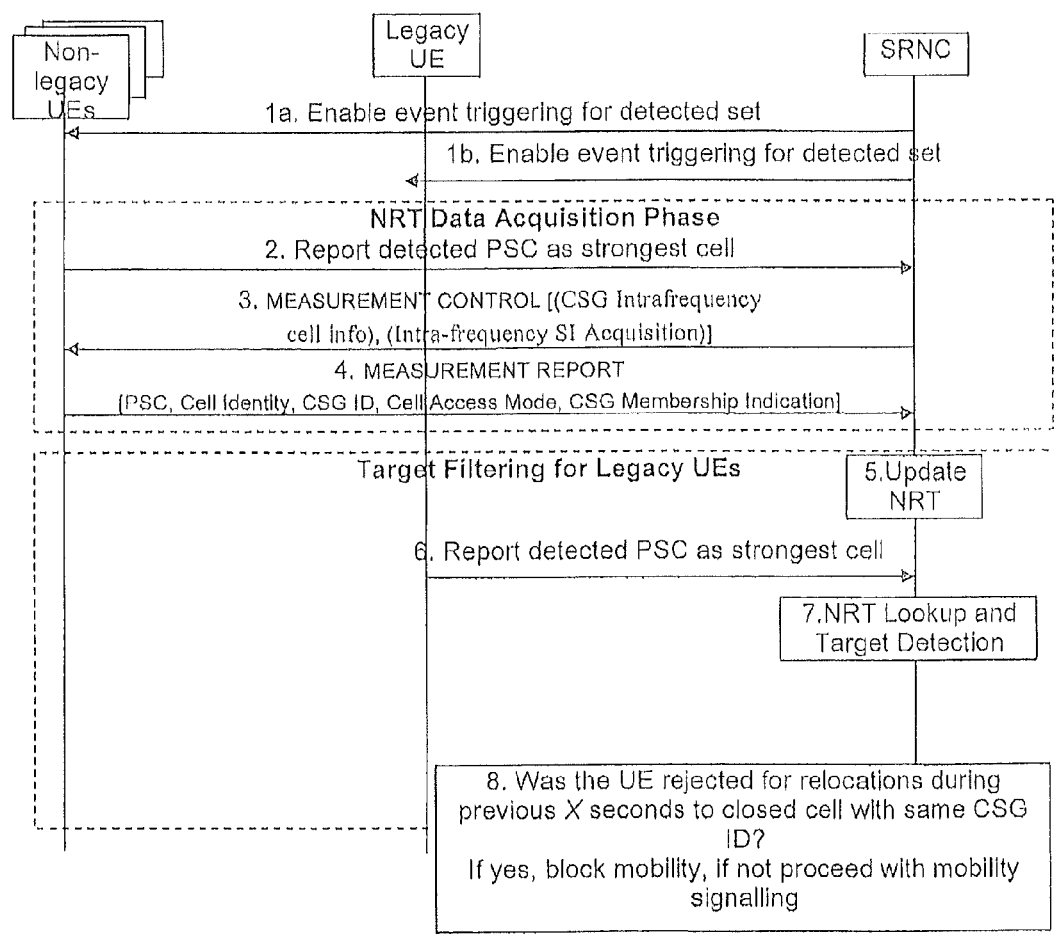
FIG. 12 is a signalling diagram illustrating a sequence of messages supporting target filtering during mobility for legacy wireless terminals (UEs) according to some embodiments.

Steps 1 to 7 of FIG. 12 are the same as those of FIG. 11. Once the target cell is found in the NRT in step 7, the SRNC will look up the CSG ID and Cell Access Mode of such target cell. Then the SRNC will check if the legacy UE has previously been rejected during relocation to a Closed Access Cell with the same CSG ID. If the UE has been rejected a pre-configured number of times (optionally occurring within a pre-configured time window), then the SRNC will prevent the UE from relocating to the target cell identified. As shown at block 8 of FIG. 12, the SNRC may determine if the UE was rejected for relocation(s) during the previous x seconds (defining a time window) to a closest cell with the same CSG ID. If so, the SNRC may block mobility of the UE. If not, the SNRC may proceed with mobility signalling.

In third embodiments, the NRT may be further enriched with timing difference information (the timing difference column in the table of FIG. 10) between source cell and target cell, as monitored by the UE (these measurements are available to legacy and non-legacy UEs).

The timing difference measurements are described in the reference 3GPP TS 25.215 v10.0.0, "Universal Mobile Telecommunications System (UMTS); Physical Layer; Measurements (FDD)," Release 10, 2011-04, and the timing difference measurements may include the following:

SFN (Target Cell)—SFN (Source Cell), where SFN (target cell) is the system frame number for downlink P-CCPCH (Primary Physical Common Control Channel) frame from target cell in the UE at the time $T_{RxSFN}$ (target cell), and SFN (source Cell) is the system frame number for the P-CCPCH frame from serving cell in the UE at the time $T_{RxSFN}$ (serving cell); and/or SFN (target cell)—CFN (source cell), where $CFN_{Tx}$ is the connection frame number for the UE transmission of an uplink DPCCH frame at the time $T_{UETx}$, and SFN is the system frame number for the neighbouring target cell P-CCPCH frame received in the UE at the time $T_{RxSFN}$ (target cell).

The SRNC may collect timing difference information for each neighbouring cell during the process of acquiring data for the NRT.

The SRNC may request the legacy UE to report timing difference information in addition to Detected Set Cells information to better identify the target cell within the cells included in the NRT.

Alternatively, the SRNC may decide not to request the Detected Set Cells from the UE and only request the timing difference measurements. With such measurement results the SRNC can look up the NRT and determine the target cell.

Once the identification is completed, the SRNC may decide to relocate the UE to the identified target.

In case the NRT look up process does not lead to determination of a single target cell, the SRNC can initiate relocation preparation procedures towards all the potential target cells identified (i.e., step 8 of FIG. 12 can be carried out for all potential targets identified).

In fourth embodiments, the enhanced NRT shown in the table of FIG. 10 is configured via Operation and Maintenance system, i.e. without the need of non-legacy UE measurement reports. With such updated NRT, the procedures described in the first and second embodiments can be carried out.

Optionally, the HNB cells in the NRT obtained from OaM system can initially be seen as candidate neighbours, not considered as confirmed neighbours until a successful relocation by a UE is completed.

In fifth embodiments, the extra information used to update the NRT as per the table of FIG. 10 and acquired via measurement reports are provided from a receiving or base RNC to a neighbour RNC that might benefit from such information to update its own NRT.

Figure 13:
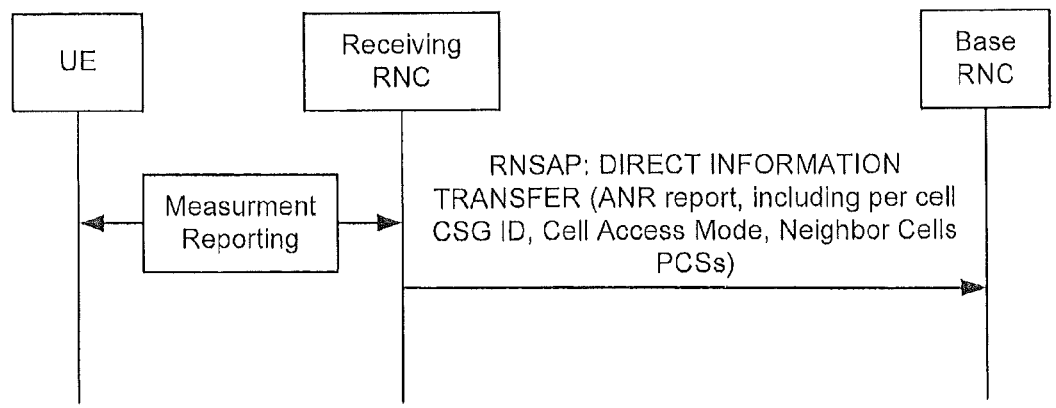
FIG. 13 is a signalling diagram illustrating a sequence supporting enhanced Automatic Neighbor Relation (ANR) report forwarding according to some embodiments.

As shown in FIG. 13, the information reported by the UE and used in the SRNC to update the NRT could be directly passed to a neighbor RNC (Base RNC in FIG. 11) via RNSAP (Radio Access Network Application Part): DIRECT INFORMATION TRANSFER message over Iur interface between neighbouring RNCs. The direct information transfer may include an ANR report with per cell CSG ID, Cell Access Mode, Neighbor Cells PSCs, etc.

Figure 14:
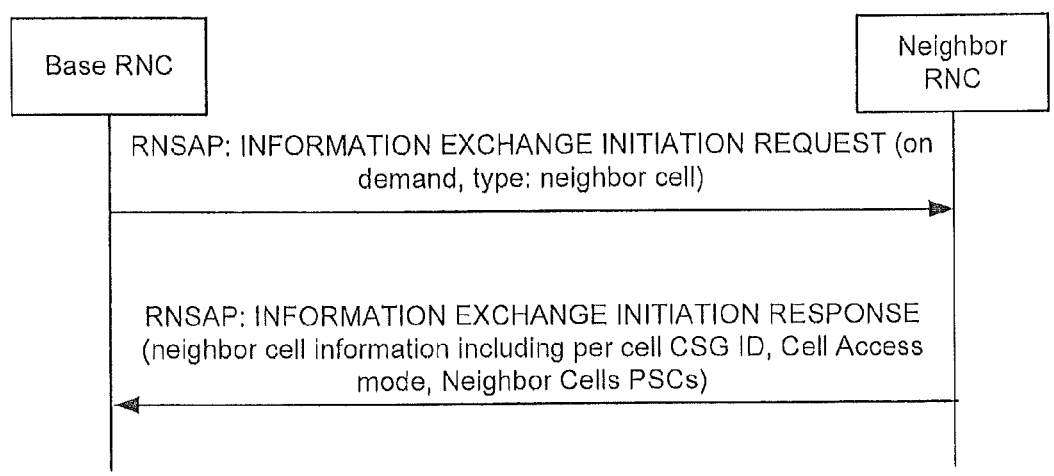
FIG. 14 is a signalling diagram illustrating a sequence supporting enhanced Neighbor cell configuration using Iur according to some embodiments.

Alternatively, an RNC could request a neighbour to share some information on neighbour cells with the purpose of updating its NRT (see FIG. 14). This can be achieved via signalling over the Iur interface between the neighbouring RNCs, where the requesting RNC would send an RNSAP: INFORMATION EXCHANGE INITIATION REQUEST (on demand, type; neighbor cell), asking for information about neighbor cells, and the neighboring RNC replies with an RNSAP: INFORMATION EXCHANGE INITIATION RESPONSE, where the neighboring cell information available in the neighboring RNC NRT, including additional information proposed according to embodiments discussed herein (including per cell CSG ID, cell access mode, neighbor cells PSCs, etc.), are sent back to the requesting RNC.

FIG. 15 illustrates significant operations according to some embodiments. Here, there are two embodiments that can confirm an HNB neighbour. Either, a non-legacy UE has reported the HNB including its broadcast information, or the HNB NRT information was provided by OaM and confirmed via a successful relocation of a legacy UE. At block 1501 of FIG. 15, a confirmed HNB neighbor is added to the RNC NRT together with its neighbor information. At block 1503, a legacy wireless terminal UE reports a scrambling code used by one or more confirmed HNBs in the NRT. At block 1505, neighbor cell measurements by the legacy wireless terminal UE are used to disclose a most probable target HNB. At block 1507, relocation to the most probable target HNB is initiated.

FIG. 16 provides a pictorial/schematic representation of how disambiguation of the target cell and relocation preparation procedures (in case of Iu based RANAP relocation) can be carried out once a database of neighbor cell information has been acquired at the SRNC and a legacy UE is involved in mobility towards cells in need of disambiguation. Couplings/interfaces between SRNC (the RNC currently communicating with the legacy UE and serving as the source of the relocation), core network CN, HNB GW, and Home NodeBs (e.g., HNBa, HNBb, HNBc, and HNBd) are discussed in greater detail above with respect to FIGS. 2, 7, and 8.

The steps/operations of FIG. 16 can be described as follows:
 1. Legacy UE reports the cell associated to/with PSC=3 as the strongest monitored cell. The UE also reports other monitored and or detected PSCs (i.e. PSC=1 and PSC=12) and the timing difference between source cell and target cell (i.e. HNBc).
 2. SRNC uses the database of neighbor cell information (for instance represented in the table of FIG. 10) to disambiguate the target cell associated to/with PSC=3 reported by the UE. Such disambiguation results in identifying HNBc as the target.

3. SRNC triggers a legacy RANAP: RELOCATION REQUIRED procedure towards the SGSN/MSC. The target cell in the relocation message is the HNBc cell (associated with PSC=3).
4. SGSN/MSC triggers RANAP: RELOCATION REQUEST to the HNB GW, which will then forward the message to HNBc.

According to some embodiments, methods may be provided to identify a target base station for handover of a wireless terminal in communication with a source base station. For example, a list of base stations and respective scrambling codes may be provided for/at the source base station. A first scrambling code of the target base station and a second scrambling code of another base station may be received from the wireless terminal. The target base station may be identified responsive to the list of base stations and respective scrambling codes and responsive to the first and second scrambling codes received from the wireless terminal. After identifying the target base station, a handover of communications may thus be initiated for the wireless terminal from the source base station to the target base station. In addition, a timing difference between the target base station and the source base station may be received from the wireless terminal, and identifying the target base station may further include identifying the target base station responsive to the timing difference. A neighbor cell list (NCL) including scrambling codes of neighbor base stations of the source base station may be broadcast, and the first scrambling code of the target base station may be excluded from (or not included in) the neighbor cell list. The target base station may be a pico cell base station, a femto cell base station, a home base station, and/or a closed subscriber group base station. The wireless terminal may be a first wireless terminal, and providing the list of neighbor base stations may include receiving a measurement report from a second wireless terminal, with the measurement report including the first scrambling code of the target base station and an identification of the target base station.

Some embodiments of the present may provide a solution to support legacy UE's mobility to cells not listed in the serving cell's NCL or to CSG cells.

Some embodiments may use processes entirely contained in the SRNC so that there is no need to modify the current interfaces or to exchange information from source to target RNC.

Some embodiments may be based on measurement configurations available for all UEs (legacy and non-legacy), making solutions more versatile and backward compatible.

Figure 17:
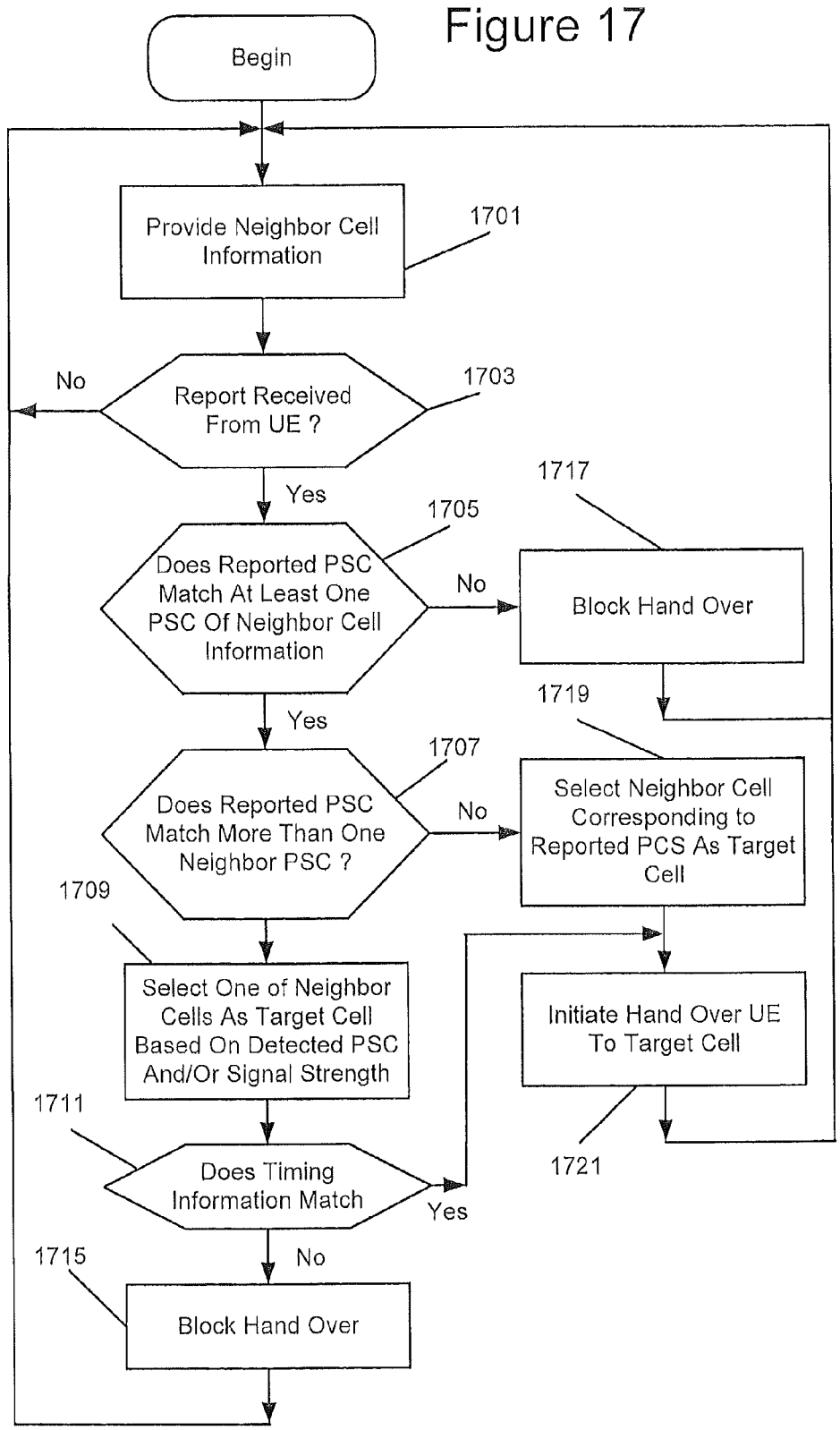

Some embodiments are discussed in greater detail below with respect to the flow chart of FIG. 17.

Methods according to some embodiments are discussed in greater detail below with respect to the flow chart of FIG. 17. At block 1701, RNC processor 801 may provide neighbor cell information (e.g., at memory 803), and the neighbor cell information may be provided as discussed above with respect to the neighbor relations table (NRT) of FIG. 10. For example, the neighbor cell information may include neighbor cell identifiers (NCIs) identifying neighbor cells neighboring a source cell (e.g., base station 100) and respective neighbor scrambling codes of the neighbor cells. In addition, the neighbor cell information may include scrambling codes of adjacent cells (e.g., adjacent cell primary scrambling codes) for the neighbor cells and/or timing differences (TDs) between the source cell and the neighbor cells. Elements of the neighbor cell information (e.g., NRT of FIG. 10) may be provided, for example, as discussed above with respect to messages/operations 1a, 2, 3, 4, and 5 of FIGS. 11 and/or 12. In addition or in an alternative, elements of neighbor cell information may be added using measurement reports from legacy UEs as discussed above.

At block 1703, a report may be received from a legacy wireless terminal 200 through the source cell, with the report identifying a reported scrambling code of a reported cell and at least one detected scrambling code of at least one detected cell other than the reported cell. According to some embodiments, the report may also include a reported timing difference between the reported cell and the source cell. The report, for example, may be provided as discussed above with message 6 of FIGS. 11 and 12.

At block 1705, RNC processor 801 may determine whether the reported scrambling code matches at least one scrambling code of a neighbor cell from the neighbor cell information of the NRT of FIG. 10. If there are no matches at block 1705, RNC processor 801 may block hand over of the legacy wireless terminal at block 1717 because RNC processor 801 is unable to identify the reported cell.

If there is at least one match at block 1705, RNC processor 801 may determine whether the reported scrambling code matches one or more than one neighbor scrambling code of a neighbor cell from the neighbor cell information. If the reported scrambling code matches only one neighbor scrambling code of a neighbor cell from the neighbor cell information at block 1707, RNC processor 801 may select the neighbor cell corresponding to the reported scrambling code as a target cell for hand over at block 1719, and RNC processor 801 may initiate hand over of wireless terminal 200 to the target cell at block 1721.

If the reported scrambling code matches a plurality of neighbor scrambling codes of neighbor cells from the neighbor cell information at block 1707, RNC processor 801 may select one of the plurality of neighbor cells corresponding to the reported scrambling code as a target cell for hand over based on the detected scrambling code at block 1709. RNC processor 801, for example, may compare the detected scrambling code with adjacent cell scrambling codes (from the table of FIG. 10) associated with each of the neighbor cells having scrambling codes matching the reported scrambling code to select one of the neighbor cells having the scrambling code matching the reported scrambling code. If the reported scrambling code matches that of NCI#1 and NCI#4 and the detected scrambling code (PCS) is 1 in the NRT of FIG. 10, for example, the detected scrambling code 1 may be used to disambiguate NCI#1 and NCI#4 to select NCI#1 as the target cell for handover because PCS 1 is not an adjacent cell PCS for NCI#4.

In addition and/or in an alternative, the neighbor cell information may include signal strengths of adjacent cells for the neighbor cells. The report of block 1703 may include a signal strength (SS) of the detected scrambling code (representing a signal strength of the detected scrambling code at the wireless terminal), and RNC processor 801 may compare the detected scrambling code signal strength with adjacent cell signal strengths SS from the NRT of FIG. 10 to select one of the neighboring cells having the scrambling code matching the reported scrambling code. If the reported scrambling code matches that of NCI#1 and NCI#5 and the detected scrambling code (PCS) is 1 in the NRT of FIG. 10, for example, the detected scrambling code 1 may be insufficient to disambiguate NCI#1 and NCI#5 because both list PCS 1 as an adjacent cell PCS. The signal strength of the detected scrambling code that is received from wireless terminal 200 may thus be compared to PCS 1 signal strengths SS#1-1 and SS#1-5 to select NCI#1 or NCI#5 having a the signal strength for PCS 1 most similar to that reported by wireless terminal 200.

At block 1711, RNC processor may then verify the selected neighbor cell using timing information for the reported scrambling code received from wireless terminal 200. If a timing difference received from wireless terminal 200 for the reported scrambling code matches the timing difference TD for the selected neighbor cell at block 1711, RNC processor 801 may initiate a hand over of wireless terminal 200 at block 1721. If the timing difference received from wireless terminal 200 does not match the timing difference TD for the selected neighbor cell at block 1711, RNC processor 801 may block hand over at block 1715.

According to other embodiments discussed below with respect to the flow chart of FIG. 18, RNC processor 801 may disambiguate neighbor cells using timing differences without first comparing a detected scrambling code with adjacent cell PCSs. Operations of blocks 1701, 1703, 1705, 1707, 1715, 1717, 1719, and 1721 of FIG. 18 may be the same as and/or similar to respective blocks 1701, 1703, 1705, 1707, 1715, 1717, 1719, and 1721 discussed above with respect to FIG. 17, and further discussion thereof may be omitted for the sake of conciseness.

The neighbor cell information of block 1701 of FIG. 18 may include neighbor cell identifiers (NCIs) identifying neighbor cells neighboring a source cell, respective neighbor scrambling codes of the neighbor cells, and timing differences (TDs) between the source cell and the neighbor cells. The report from a wireless terminal 200 of block 1703 may identify a reported scrambling code of a reported cell and a reported timing difference between the reported cell and the source cell. If the reported scrambling code does not match any of the scrambling codes of the neighbor cell information at block 1705, RNC processor 801 may block hand over at block 1717. If the reported scrambling code matches a scrambling code of only one neighbor PSC at block 1707, RNC processor may select the neighbor cell corresponding to the reported scrambling code as the target cell for handover at block 1709 and initiate hand over of the wireless terminal to the selected target cell at block 1721.

If the reported scrambling code matches a scrambling code of more than one neighbor cell at block 1707, RNC processor 801 may use timing differences to disambiguate the neighbor cells. At block 1809, for example, RNC processor may select one of the neighbor cells (having the scrambling code matching the reported scrambling code) as a target cell for hand over based on comparing the reported timing difference with the timing differences (TD) of the neighbor cell information from the NRT of FIG. 10. Of the neighbor cells having the primary scrambling code matching the reported scrambling code, for example, the neighbor cell having the timing difference (TD) of FIG. 10 most closely matching the timing difference (between the reported cell and the source cell) reported by the wireless terminal at block 1701 may be selected as the target cell for hand over at block 1809.

At block 1811, RNC processor 801 may determine if the timing difference of the selected neighbor cell is a sufficiently close match to the timing difference reported by the wireless terminal. RNC processor 801, for example, may block the hand over at block 1715 if the match is not sufficiently close, or RNC processor 801 may initiate hand over of the wireless terminal from the source cell to the target cell if the match is sufficiently close. Even though the timing difference of the selected neighbor cell is the best available match for the reported neighbor cell from the neighbor cell information, operations of block 1811/1715 may block the hand over because the selected neighbor cell does not match the reported cell. Stated in other words, none of the neighbor cells of the NRT may match the reported cell.

As discussed above with respect to messages of FIGS. 11 and 12, elements of the neighboring cell information associated with the NRT of FIG. 10 may be provided at block 1701 based on reporting from non-legacy and/or legacy wireless terminals according to some embodiments discussed herein. By way of example, reports from non-legacy wireless terminals may be received through source cell (e.g., base station 100) at RNC 80, and information from these reports may be used to populate neighboring cell information associated with the NRT of FIG. 10. A report from a non-legacy wireless terminal, for example, may include a reported scrambling code of a reported cell, and at least one detected scrambling code of the at least one detected cell (associated with the reported cell), and providing the neighbor cell information at block 1701 may include adding the reported scrambling code of the reported cell and the at least one detected scrambling code to the neighbor cell information for the source cell responsive to the report from the non-legacy wireless terminal. The report from the non-legacy wireless terminal may also include a timing difference between the reported cell and the source cell, and providing the neighbor cell information may include adding the timing difference to the neighbor cell information responsive to the report from the non-legacy wireless terminal. In addition or in an alternative, the report from the non-legacy wireless terminal may include a signal strength of the at least one detected scrambling code, and providing the neighbor cell information may include adding the signal strength to the neighbor cell information responsive to the second report.

ABBREVIATIONS

| | |
|---|---|
| 3GPP | 3rd Generation Partnership Project |
| ANR | Automatic Neighbour Relation |
| CGI | Cell Global Identity |
| C-ID | Cell Identity |
| CSG | Closed Subscriber Group |
| NB | Node B |
| CGI | Cell Global Identifier |
| UTRAN | Universal Terrestrial Radio Access Network |
| HNB | Home Node B |
| HO | Handover |
| LAC | Location Area Code |
| NCI | Neighbour Cell Identifier |
| NRT | Neighbour Relation Table |
| O&M | Operations and Maintenance system |
| PSC | Primary Scrambling Code |
| PLMN | Public Land Mobile Network |
| RAN | Radio Access Network |
| RAC | Routing Area Code |
| RNC | Radio Network Controller |
| SRNC | Serving RNC |
| SIB | System Information Block |
| UE | User Equipment |
| RANAP | Radio Access Network Application Part |
| SGSN | Serving GPRS Support Node |
| GPRS | General Packet Radio Service |
| MSC | Mobile Switching Center |

References (the disclosures of each of the following references are hereby incorporated herein in their entireties by reference):

1) 3GPP TS 25.367 Rel-10 V10.0.0, "Mobility Procedures For Home Node B (HNB)," Stage 2, Release 10, 2011-03.
2) Alcatel-Lucent, TSG RAN Meeting #51, RP-110456 "Proposed SID: Further Enhancements For HNB And HeNB," Kansas City, Mar. 15-18, 2011.

3) 3GPP TS 25.484 V10.0.0, "Automatic Neighbour Relation (ANR) for UTRAN," Stage 2, Release 10, 2011-07.
4) 3GPP TS 25.331 V10.3.1, "Radio Resource Control (RRC); Protocol Specification," Release 10, 2011-05.
5) Qualcomm Inc., et al., 3GPP TSG RAN WG3 #73bis, R3-112600, "Legacy UE Macro to HNB Active Hand-in," Zhuhai, China, Oct. 10-14, 2011.
6) Alcatel-Lucent, et al., 3GPP TSG-RAN3 Meeting #73, R3-112026, "Macro To Small Cell, Metro Cell Hand-In," Athens Greece, Aug. 22-26, 2011.
7) 3GPP TS 25.215 v10.0.0, "Physical layer; Measurements (FDD)," Release 10, 2011-04.
8) 3GPP TS 25.467 V10.2.0, "UTRAN Architecture For 3G Home Node B (HNB)," Stage 2, Release 10, 2011-07.

Further Definitions:

When an element is referred to as being "connected", "coupled", "responsive", or variants thereof to another element, it can be directly connected, coupled, or responsive to the other element or one or more intervening elements may be present. In contrast, when an element is referred to as being "directly connected", "directly coupled", "directly responsive", or variants thereof to another element, there are no intervening elements present. Like numbers refer to like nodes/elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or", abbreviated "/", includes any and all combinations of one or more of the associated listed items.

As used herein, the terms "comprise", "comprising", "comprises", "include", "including", "includes", "have", "has", "having", or variants thereof are open-ended, and include one or more stated features, integers, nodes, steps, components or functions but do not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. Examples of embodiments of aspects of present inventive concepts explained and illustrated herein include their complimentary counterparts. The same reference numerals or the same reference designators denote the same or similar elements throughout the specification.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of inventive concepts may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Other network elements, communication devices and/or methods according to embodiments of inventive concepts will be or become apparent to one with skill in the art upon review of the present drawings and description. It is intended that all such additional network elements, devices, and/or methods be included within this description, be within the scope of present inventive concepts, and be protected by the accompanying claims. Moreover, it is intended that all embodiments disclosed herein can be implemented separately or combined in any way and/or combination.

That which is claimed is:

1. A method of operating a radio access network, the method comprising:

providing neighbor cell information identifying neighbor cells of a source cell and respective neighbor scrambling codes of the neighbor cells;

receiving a report from a wireless terminal through the source cell wherein the report identifies a reported scrambling code of a reported cell and at least one detected scrambling code of at least one detected cell other than the reported cell; and selecting one of the neighbor cells as a target cell based on the reported scrambling code, the at least one detected scrambling code, and the neighbor cell information.

2. The method according to claim 1 wherein the neighbor cell information further identifies respective adjacent scrambling codes of adjacent cells for the neighbor cells, wherein selecting one of the neighbor cells comprises selecting one of the neighbor cells as the target cell based on comparing the reported scrambling code with the neighbor scrambling codes of the neighbor cell information and based on comparing the at least one detected scrambling code with the adjacent scrambling codes of the neighbor cell information.

3. The method according to claim 1 further comprising:

responsive to selecting one of the neighbor cells as the target cell, initiating a handover of communications for the wireless terminal from the source cell to the target cell.

4. The method according to claim 1 wherein selecting one of the neighbor cells comprises selecting one of the neighbor cells as the target cell based on the reported scrambling code and the at least one detected scrambling code responsive to the reported scrambling code of the reported cell matching more than one of the neighbor scrambling codes of neighbor cells from the neighbor cell information for the source cell.

5. The method according to claim 1 wherein the neighbor cell information further includes respective adjacent scrambling codes of adjacent cells for the neighbor cells and timing differences between the source cell and the neighbor cells, wherein the report includes a reported timing difference between the reported cell and the source cell, and wherein selecting one of the neighbor cells comprises selecting one of the neighbor cells as the target cell based on comparing the reported scrambling code with the neighbor scrambling codes of the neighbor cell information, based on comparing the at least one detected scrambling code with the adjacent scrambling codes of the neighbor cell information, and based on comparing the reported timing difference with at least one of the timing differences of the neighbor cell information.

6. The method according to claim 1 wherein the neighbor cell information further includes respective adjacent scrambling codes and signal strengths of adjacent cells for the neighbor cells, wherein the report includes a reported signal strength for the at least one detected scrambling code, and wherein selecting one of the neighbor cells comprises selecting one of the neighbor cells as the target cell based on comparing the reported scrambling code with the neighbor scrambling codes of the neighbor cell information, based on comparing the at least one detected scrambling code with the adjacent scrambling codes of the neighbor cell information, and based on comparing the reported signal strength with at least one of the adjacent signals strengths of the neighbor cell information.

7. The method according to claim 1 wherein the wireless terminal comprises a first wireless terminal, wherein the report comprises a first report, wherein providing the neighbor cell information includes receiving a second report from a second wireless terminal through the source cell, wherein the second report includes the reported scrambling code of the reported cell, and the at least one detected scrambling code of the at least one detected cell, and wherein providing the neighbor cell information includes adding the reported scrambling code of the reported cell, and the at least one detected scrambling code to the neighbor cell information for the source cell responsive to the second report.

8. The method according to claim 7 wherein the second report includes a timing difference between the reported cell and the source cell, and wherein providing the neighbor cell information includes adding the timing difference to the neighbor cell information responsive to the second report.

9. The method according to claim 7 wherein the second report includes a signal strength associated with the at least one detected scrambling code, and wherein providing the neighbor cell information includes adding the signal strength to the neighbor cell information as a signal strength of an adjacent cell for a neighbor cell responsive to the second report.

10. The method according to claim 1 wherein the neighbor cell information includes neighbor cell identifiers identifying the neighbor cells of the source cell.

11. A radio network controller of a radio access network, the radio network controller comprising:

means for providing neighbor cell information identifying neighbor cells of a source cell and respective neighbor scrambling codes of the neighbor cells;

means for receiving a report from a wireless terminal through the source cell wherein the report identifies a reported scrambling code of a reported cell and at least one detected scrambling code of at least one detected cell other than the reported cell; and means for selecting one of the neighbor cells as a target cell based on the reported scrambling code, the at least one detected scrambling code, and the neighbor cell information.

12. The radio network controller according to claim 11 wherein the neighbor cell information further identifies respective adjacent scrambling codes of adjacent cells for the neighbor cells, wherein the means for selecting one of the neighbor cells comprises means for selecting one of the neighbor cells as the target cell based on comparing the reported scrambling code with the neighbor scrambling codes of the neighbor cell information and based on comparing the at least one detected scrambling code with the adjacent scrambling codes of the neighbor cell information.

13. The radio network controller according to claim 11 further comprising:
means for initiating a handover of communications for the wireless terminal from the source cell to the target cell responsive to selecting one of the neighbor cells as the target cell.

14. The radio network controller according to claim 11 wherein the means for selecting one of the neighbor cells comprises means for selecting one of the neighbor cells as the target cell based on the reported scrambling code and the at least one detected scrambling code responsive to the reported scrambling code of the reported cell matching more than one of the neighbor scrambling codes of neighbor cells from the neighbor cell information for the source cell.

15. The radio network controller according to claim 11 wherein the neighbor cell information further includes respective adjacent scrambling codes of adjacent cells for the neighbor cells and timing differences between the source cell and the neighbor cells, wherein the report includes a reported timing difference between the reported cell and the source cell, and wherein the means for selecting one of the neighbor cells comprises means for selecting one of the neighbor cells as the target cell based on comparing the reported scrambling code with the neighbor scrambling codes of the neighbor cell information, based on comparing the at least one detected scrambling code with the adjacent scrambling codes of the neighbor cell information, and based on comparing the reported timing difference with at least one of the timing differences of the neighbor cell information.

16. The radio network controller according to claim 11 wherein the neighbor cell information further includes respective adjacent scrambling codes and signal strengths of adjacent cells for the neighbor cells, wherein the report includes a reported signal strength for the at least one detected scrambling code, and wherein the means for selecting one of the neighbor cells comprises means for selecting one of the neighbor cells as the target cell based on comparing the reported scrambling code with the neighbor scrambling codes of the neighbor cell information, based on comparing the at least one detected scrambling code with the adjacent scrambling codes of the neighbor cell information, and based on comparing the reported signal strength with at least one of the adjacent signals strengths of the neighbor cell information.

17. The radio network controller according to claim 11 wherein the wireless terminal comprises a first wireless terminal, wherein the report comprises a first report, wherein the means for providing the neighbor cell information includes means for receiving a second report from a second wireless terminal through the source cell, wherein the second report includes the reported scrambling code of the reported cell, and the at least one detected scrambling code of the at least one detected cell, and wherein the means for providing the neighbor cell information includes means for adding the reported scrambling code of the reported cell, and the at least one detected scrambling code to the neighbor cell information for the source cell responsive to the second report.

18. The radio network controller according to claim 17 wherein the second report includes a timing difference between the reported cell and the source cell, and wherein the means for providing the neighbor cell information includes means for adding the timing difference to the neighbor cell information responsive to the second report.

19. The radio network controller according to claim 11 wherein the second report includes a signal strength associated with the at least one detected scrambling code, and wherein the means for providing the neighbor cell information includes means for adding the signal strength to the neighbor cell information as a signal strength of an adjacent cell for a neighbor cell responsive to the second report.

20. The radio network controller according to claim 11 wherein the neighbor cell information includes neighbor cell identifiers identifying the neighbor cells of the source cell.

21. A radio network controller of a radio access network, the radio network controller comprising:
a processor configured to provide neighbor cell information identifying neighbor cells of a source cell and respective neighbor scrambling codes of the neighbor cells, to receive a report from a wireless terminal through the source cell wherein the report identifies a reported scrambling code of a reported cell and at least one detected scrambling code of at least one detected cell other than the reported cell, and to select one of the neighbor cells as a target cell based on the reported scrambling code, the at least one detected scrambling code, and the neighbor cell information.

22. A method of operating a radio access network, the method comprising:
providing neighbor cell information identifying neighbor cells of a source cell, respective neighbor scrambling codes of the neighbor cells, and timing differences between the source cell and the neighbor cells;
receiving a report from a wireless terminal through the source cell wherein the report identifies a reported scrambling code of a reported cell and a reported timing difference between the reported cell and the source cell; and
selecting one of the neighbor cells as a target cell based on the reported scrambling code, the reported timing difference, and the neighbor cell information.

23. The method according to claim 22 wherein selecting one of the neighbor cells comprises selecting one of the neighbor cells as the target cell based on comparing the reported scrambling code with the neighbor scrambling codes of the neighbor cell information, and based on comparing the reported timing difference with at least one of the timing differences of the neighbor cell information.

24. The method according to claim 22 wherein the neighbor cell information further includes respective adjacent scrambling codes of adjacent cells for the neighbor cells, wherein the report identifies at least one detected scrambling code of at least one detected cell, and wherein selecting one of the neighbor cells further comprises selecting one of the neighbor cells as the target cell based on comparing the reported scrambling code with the neighbor scrambling codes of the neighbor cell information, based on comparing the at least one detected scrambling code with the adjacent scrambling codes of the neighbor cell information, and based on comparing the reported timing difference with at least one of the timing differences of the neighbor cell information.

25. The method according to claim 22 further comprising:
responsive to selecting one of the neighbor cells as the target cell, initiating a handover of communications for the wireless terminal from the source cell to the target cell.

26. The method according to claim 22 wherein selecting one of the neighbor cells comprises selecting one of the neighbor cells as the target cell based on the reported scrambling code and the neighbor cell information responsive to the reported scrambling code of the reported cell matching more than one of the neighbor scrambling codes of neighbor cells from the neighbor cell information for the source cell.

27. A radio network controller of a radio access network, the radio network controller comprising:
- means for providing neighbor cell information identifying neighbor cells of a source cell, respective neighbor scrambling codes of the neighbor cells, and timing differences between the source cell and the neighbor cells;
- means for receiving a report from a wireless terminal through the source cell wherein the report identifies a reported scrambling code of a reported cell and a reported timing difference between the reported cell and the source cell; and
- means for selecting one of the neighbor cells as a target cell based on the reported scrambling code, the reported timing difference, and the neighbor cell information.

28. A radio network controller of a radio access network, the radio network controller comprising:
- a processor configured to provide neighbor cell information identifying neighbor cells of a source cell, respective neighbor scrambling codes of the neighbor cells, and timing differences between the source cell and the neighbor cells, to receive a report from a wireless terminal through the source cell wherein the report identifies a reported scrambling code of a reported cell and a reported timing difference between the reported cell and the source cell, and to select one of the neighbor cells as a target cell based on the reported scrambling code, the reported timing difference, and the neighbor cell information.

* * * * *

UNITED STATES PATENT AND TRADEMARK OFFICE
CERTIFICATE OF CORRECTION

PATENT NO. : 8,488,586 B2  
APPLICATION NO. : 13/640300  
DATED : July 16, 2013  
INVENTOR(S) : Centonza et al.

Page 1 of 1

It is certified that error appears in the above-identified patent and that said Letters Patent is hereby corrected as shown below:

On the Title Page, Item (72), under "Inventors", in Column 1, Line 2, delete "Linkoping" and insert -- Linköping --, therefor.

On the Title Page, Item (56), under "OTHER PUBLICATIONS", in Column 2, Line 5, delete "10.03.0160/" and insert -- 10.03.01_60/ --, therefor.

In the Drawings

Figure 1:
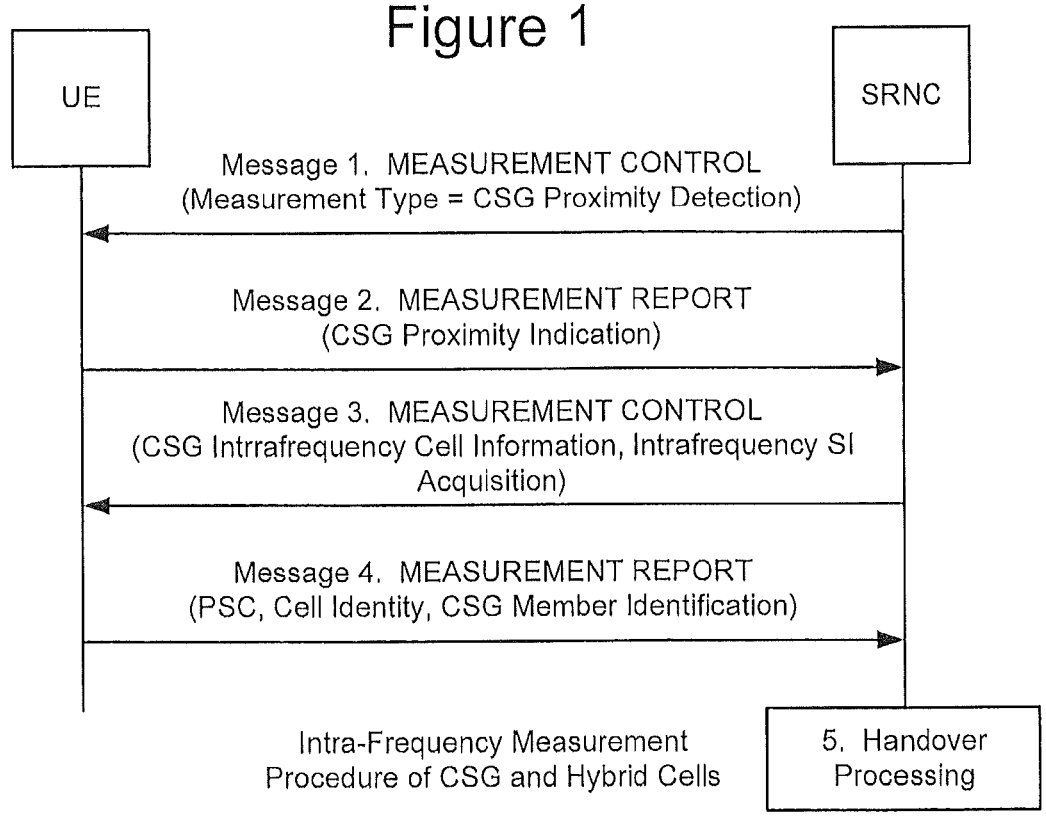
FIG. 1 is a signalling diagram illustrating intra-frequency measurement procedures of closed subscriber group (CSG) and hybrid cells.

In Fig. 1, Sheet 1 of 13, under "Message 3.", in Line 1, delete "intrrafrequency" and insert -- intrafrequency --, therefor.

In Fig. 11, Sheet 8 of 13, under "4. MEASUREMENT REPORT", in Line 1, delete "Mod,e" and insert -- Mode --, therefor.

In the Specifications

In Column 4, Line 36, delete "ARFCN)" and insert -- ARFCN). --, therefor.

In Column 22, Line 32, delete "(DVD/BlueRay)." and insert -- (DVD/Blu Ray). --, therefor.

Signed and Sealed this  
Sixth Day of May, 2014

Michelle K. Lee  
*Deputy Director of the United States Patent and Trademark Office*